(12) United States Patent
Garcia Agudo et al.

(10) Patent No.: US 9,062,157 B2
(45) Date of Patent: Jun. 23, 2015

(54) LATE-ADDITION CATALYST FORMULATION, REACTOR SYSTEM, AND METHOD FOR PRODUCING POLYCARBONATE

(75) Inventors: Jorge A. Garcia Agudo, Murcia (ES); Ignacio Vic Fernandez, Santo Angel (ES); Kazutoyo Uno, Murcia (ES); Fernando Olmedo Fernandez, Murcia (ES); Isabel Macian Aviles, Murcia (ES)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/129,601

(22) PCT Filed: Jun. 21, 2012

(86) PCT No.: PCT/IB2012/053156
§ 371 (c)(1),
(2), (4) Date: Feb. 14, 2014

(87) PCT Pub. No.: WO2013/001427
PCT Pub. Date: Jan. 3, 2013

(65) Prior Publication Data
US 2014/0228526 A1 Aug. 14, 2014

(30) Foreign Application Priority Data

Jun. 29, 2011 (EP) .................................... 11382217

(51) Int. Cl.
*C08G 64/00* (2006.01)
*C08G 64/42* (2006.01)
*C08G 64/30* (2006.01)
*C08G 63/02* (2006.01)

(52) U.S. Cl.
CPC .............. *C08G 64/42* (2013.01); *C08G 64/305* (2013.01); *C08G 64/307* (2013.01)

(58) Field of Classification Search
CPC ....... C08G 64/06; C08G 64/14; C08G 64/307
USPC .................. 528/196, 198; 264/176.1, 211.12
See application file for complete search history.

(56) References Cited

U.S. PATENT DOCUMENTS

| | | | |
|---|---|---|---|
| 5,525,701 A | 6/1996 | Tominari et al. | |
| 7,057,004 B2 | 6/2006 | Kamps et al. | |
| 7,151,189 B2 | 12/2006 | Murthy et al. | |
| 7,339,070 B2 | 3/2008 | Murthy et al. | |
| 7,547,799 B1 | 6/2009 | Belfadhel et al. | |
| 7,619,053 B2 | 11/2009 | Brack et al. | |
| 7,629,432 B2 | 12/2009 | Kamps et al. | |
| 7,671,165 B2 | 3/2010 | Brack et al. | |
| 8,629,235 B2 * | 1/2014 | Namiki et al. ................. | 528/271 |
| 2003/0120023 A1 | 6/2003 | Matsumoto et al. | |
| 2004/0242834 A1 | 12/2004 | Ueno | |
| 2009/0286952 A1* | 11/2009 | Brack et al. .................... | 528/196 |

FOREIGN PATENT DOCUMENTS

| | | |
|---|---|---|
| CN | 1306022 A | 8/2001 |
| EP | 0992522 A1 | 4/2000 |
| EP | 1266883 A1 | 12/2002 |
| EP | 1803704 A1 | 7/2007 |
| WO | 03057758 A1 | 7/2003 |

OTHER PUBLICATIONS

International Search Report for International Application No. PCT/IB2012/053156; International Filing Date Jun. 21, 2012; Date of Mailing Jan. 31, 2013; 7 pages.
Written Opinion of the International Search Report for International Application No. PCT/IB2012/053156; International Filing Date Jun. 21, 2012; Date of Mailing Jan. 31, 2013; 9 pages.
European Search Report for Europeanl Application No. 13191754.4; Date of Completion Jan. 20, 2014; Date of Mailing Feb. 3, 2014; 5 pages.

* cited by examiner

*Primary Examiner* — Terressa Boykin
(74) *Attorney, Agent, or Firm* — Cantor Colburn LLP

(57) ABSTRACT

The present invention provides a melt polymerization reactor system and method of producing polycarbonate using a late-addition catalyst formulation having a melt transesterification catalyst dispersed in a liquid carrier system which preferably includes less than 10 wt % water. The formulation also preferably includes a liquid carrier system having phenol and a cosolvent. The melt transesterification catalyst can be present in the formulation in a range of 50 ppm to 60,000 ppm.

45 Claims, 12 Drawing Sheets

LATE-ADDITION CATALYST FORMULATION, REACTOR SYSTEM, AND METHOD FOR PRODUCING POLYCARBONATE

CROSS-REFERENCE TO RELATED APPLICATION

This Application is a U.S. National Stage Application of PCT/IB2012/053156 filed Jun. 21, 2012, which claims priority from European Patent Application No. 11382217.5, filed Jun. 29, 2011, both of which are incorporated by reference in their entirety.

BACKGROUND

Melt polycarbonate is produced by the melt transesterification reaction of a dihydroxy compound (e.g. bisphenol A) and a diaryl carbonate (e.g. diphenyl carbonate) in the presence of a melt transesterification catalyst. Polymerization takes place in a series of reactors where operating conditions such as temperature and pressure are controlled so that the reaction byproduct, phenol, is removed from reaction components thereby driving the reaction by equilibrium displacement.

Two classes of catalysts, alpha and beta catalysts, are used in melt transesterification processes due in part to the temperature profile of the melt reaction process. Organic catalysts (i.e. beta catalysts) like tetrabutylphosphonium acetate or tetramethylammonium hydroxide are effective at the early formulation and oligomerization stages where temperature is below 200° C. Many beta catalysts however are volatile and can degrade at elevated temperature and reduced pressure leading to a loss of the catalysts from the reaction mixture. Due to the thermal degradation and volatility loss of the beta catalyst, an alkali or alkaline earth metal type catalyst (i.e. an alpha catalyst) is used to catalyze the reaction at higher temperature and reduced pressure. However, certain types of beta catalysts are stable along the polymerization process conditions (including the high temperatures and reduced pressures) and can be used solely or in combination with an alpha catalyst.

In a typical melt transesterification production facility all desired reaction components including melt transesterification catalyst(s), dihydroxy compound(s), and diaryl carbonate(s) are combined and mixed in a formulation and/or oligomerization tank(s) to form a reaction mixture suitable for continued polymerization throughout the balance of the polymerization system. After the reaction mixture is formed it is introduced to a series of polymerization reactors operating under melt polymerization conditions sufficient to build at least molecular weight to produce polycarbonate within a desired specification.

With respect to producing a product polycarbonate with desired specifications, the selection of melt transesterification catalysts as well as adjustment of process conditions allow for the production of polycarbonate resins that are differentiated by, among other things, molecular weight, branching, and terminal endgroups. By adjusting these variables different polymer grades can be produced using the same dihydroxy and carbonate monomer starting materials. In other words, adjusting the front end reaction mixture and/or the reaction system set points (e.g. flow rates, torques, reactor temperatures and/or pressures) provides the ability to produce polycarbonate having specific characteristics. This is an energy and equipment intensive process, which is further exacerbated when producing high branch and/or high molecular weight product polycarbonates; high branched and/or high molecular weight polycarbonate production typically require higher energy inputs along the system as the viscosity builds as the reaction mixture moves through the reactor system. Furthermore, it is noted that when a new grade of polymer is to be produced, the transition materials within the reactor system are purged and discarded until the new product polycarbonate meets desired specifications. This leads to wasted material, increased cost, and inefficiencies in the process.

Based upon the foregoing, improvements in the melt polycarbonate production process are desired to tackle the above-mentioned inefficiencies. In particular it would be most desirable to have the ability to produce a broad range of polycarbonate grades with superior qualities, including color, while minimizing process equipment, energy input, process steps, and wasted transition material. The present disclosure addresses these inefficiencies.

BRIEF SUMMARY

The first two embodiments of the present invention provide reactor systems and methods for producing product polycarbonate(s) from an intermediate polycarbonate. A late-addition catalyst formulation containing a melt transesterification catalyst dispersed in a liquid carrier is introduced to the intermediate polycarbonate and the combined mixture is further reacted to produce product polycarbonate(s). In one embodiment the reactor systems and methods of the present invention utilize the specific late-addition catalyst formulation of the third embodiment.

According to the first embodiment, the present invention provides a melt polymerization reactor system for producing polycarbonate. The reactor system includes a first polymerization reactor, a first finishing line having a second polymerization reactor, and a late-addition catalyst vessel. The reactor system is connected in the following configuration: the first finishing line connected to the first polymerization reactor; and the late-addition catalyst vessel connected to the first finishing line at the second polymerization reactor, between the first and second polymerization reactor, or a combination thereof. This first polymerization reactor contains an intermediate polycarbonate having characteristic different from the product polycarbonate in the second polymerization reactor. For example, the first polymerization reactor contains an intermediate polycarbonate having a number average molecular weight (Mn) based upon polycarbonate standards (GPC) of 2,500 to 25,000 g/mol and unreacted reaction components including a dihydroxy compound, a diaryl carbonate, and a melt transesterification catalyst. The second polymerization reactor can contain a product polycarbonate having a higher molecular weight than the polycarbonate in the first polymerization reactor, a higher branching content than the polycarbonate in the first polymerization reactor, or both. Where the product polycarbonate has a higher content of branching structures than the intermediate, it is possible for the product polycarbonate to have the same, a higher, or a lower molecular weight that the intermediate polycarbonate. The late-addition catalyst vessel contains a late-addition catalyst formulation comprising a melt transesterification catalyst dispersed in a liquid carrier system.

According to the second embodiment, the present invention provides a method for producing a product polycarbonate. The first step involves treating a plurality of reaction components (e.g. a dihydroxy compound, a diaryl carbonate, and a melt transesterification catalyst) under melt polymerization conditions sufficient to produce an intermediate polycarbonate having a number average molecular weight (Mn)

based upon polycarbonate standards (GPC) of 2,500 to 25,000. The second step involves introducing a late-addition catalyst formulation to the intermediate polycarbonate produced in the first step in an amount effective to catalyze molecular weight build, a branching reaction, or both molecular weight build and a branching reaction. As noted above, the late-addition catalyst formulation contains a melt transesterification catalyst dispersed in a liquid carrier system. The third step includes treating the intermediate polycarbonate and late-addition catalyst formulation from the second step under melt polymerization conditions sufficient to produce a product polycarbonate having desired specifications. For example the product polycarbonate can have a higher molecular weight than the intermediate polycarbonate formed in the first step, a higher content of branching structures than the intermediate polycarbonate formed in the first step, or both.

According to the third embodiment, the present invention provides a late-addition catalyst formulation which includes a melt transesterification catalyst dispersed in a liquid carrier system comprising phenol and a cosolvent. The formulation contains less than 10 wt % water and the melt transesterification catalyst is present in the formulation in a range of 50 ppm to 60,000 ppm.

DETAILED DESCRIPTION

Figure 1:
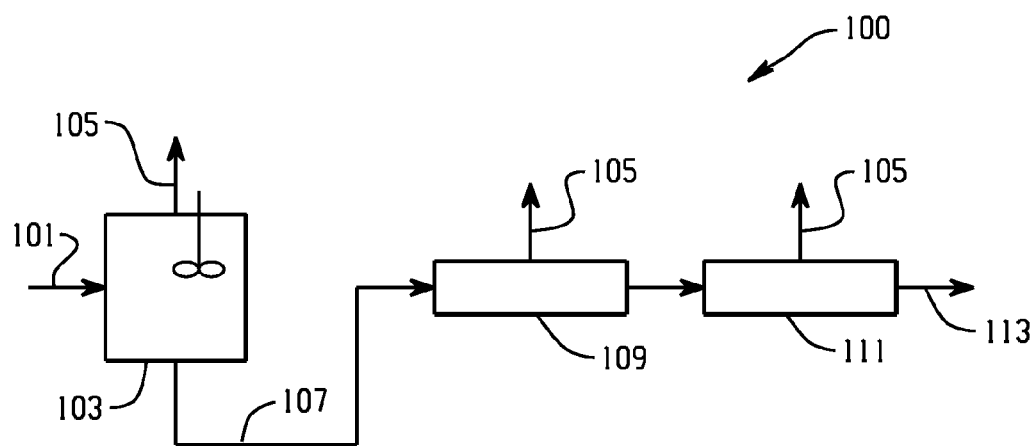
FIG. 1 shows a melt polymerization reaction system of the prior art.

The present invention may be understood more readily by reference to the following detailed description of preferred embodiments of the invention and the examples included herein. The present invention is premised, in part, upon the finding that an intermediate polycarbonate feedstock can be prepared that is suitably used in supplemental reaction steps in the presence of supplemental catalyst and varying reaction conditions to produce a broad range of product polycarbonates in one or more finishing lines. The product polycarbonate(s) exiting the one or more finishing lines are differentiated from the intermediate polycarbonate and optionally each other by, inter alia, molecular weight and/or branching content. The intermediate polycarbonate is prepared by treating a dihydroxy compound, a diaryl carbonate, and a melt transesterification catalyst under melt polymerization conditions sufficient to build a polycarbonate with a number average molecular weight (Mn) based upon polycarbonate standards (GPC) of 2,500 to 25,000 g/mol. The intermediate polycarbonate then can be divided/diverted into one or more finishing lines to which a late-addition catalyst formulation is introduced. The late-addition catalyst formulation contains a melt transesterification catalyst, selected to produce desired catalytic activity within the intermediate polycarbonate, which is dispersed in a liquid carrier. The combined mixture then can be further treated to increase molecular weight and/or branching content to produce product polycarbonate. After reading and understanding the teachings of the present disclosure, one skilled in the art will readily be able to select reaction components, melt transesterification catalysts, late-addition catalyst formulation concentrations and flow rates, as well as process operating conditions (e.g. temperatures, pressures, torques, and flow rates, etc.) that are suitable for producing intermediate and product polycarbonates having desired specifications.

It has been found that it is most effective and efficient to add the supplemental catalyst in a liquid carrier system. In particular use of a liquid carrier system provides the ability to prepare a large quantity of the late-addition catalyst formulation suitable for hours/days of continuous, semi-continuous, or batch plant operation while being able to meter precise quantities of catalyst directly to the intermediate polycarbonate. Furthermore, it has been found that introducing the late-addition catalyst to the intermediate polycarbonate in a liquid carrier system allows for the efficient introduction of the catalyst at a range of temperatures so as not to disturb reaction conditions, control color formation, and disburse the catalyst to ensure supplemental catalytic activity.

The reactor systems and methods of the present invention provide the ability to produce a broad range of polycarbonate grades from the same starting reaction components while minimizing waste and maximizing plant efficiency. For example the reactor system and methods of the present invention allow for the preparation of an intermediate polycarbonate feedstock in an initial reactor system/scheme. This feedstock has desired initial characteristics and can be divided/diverted into one or more finishing line where smaller amounts of transition materials and energy inputs are required. The benefits of the present reactor systems and methods are quickly realized, for example, in the ability to produce any combination of high/mid/low branched and/or molecular weight polycarbonate products in any number of desired or required finishing lines all the while using the same intermediate polycarbonate feedstock. Furthermore, the conditions for and the build up of the desired characteristic such as high branch content and/or high molecular weight are caused in the final reaction section(s) of the plant. This provides a reduction in energy input and plant equipment as compared to processes where the condition for and build of the desired characteristic must be present from the start of the polymerization process.

In addition to the benefits described herein with regard to the reactor systems and methods of the present invention, the present Inventors have quite unexpectedly found specific late-addition catalyst formulations for use with the methods and reactor systems of the present invention. Not to be limited by theory, while water is quite satisfactory for dispersing and/or dissolving melt transesterification catalyst it has been found that the presence of water in melt polymerization reaction mixtures has adverse consequences. In particular, water has been found to hydrolyze terminal end groups of the polymer chain leading to, inter alia, a decrease in molecular weight and end capping. In some embodiments the late addition catalyst formulations used in the present reactor systems and methods will contain less than 10 weight percent (wt %) water (e.g. less than 5 wt %, specifically, less than 1 wt %, or more specifically no water). Unless specified otherwise, the weight percent water of the late addition catalyst formulations is based upon the total weight of the late addition catalyst formulations.

In yet a further aspect of the present disclosure, a specific late-addition catalyst formulation has been found that allows for the preparation and introduction of the formulation at reduced temperatures (e.g. at room temperature). This has been found to provide the ability to reduce color formation in the product polycarbonates which is believed to be caused by the degradation of catalyst at elevated temperatures. Furthermore, it has been found that this formulation can be introduced directly to an intermediate polycarbonate in the reactor systems and methods of the present invention to provide catalytic activity without the need of a separate mixing step or equipment.

DEFINITIONS

As used in the specification and claims of this application, the following definitions, should be applied.

"a", "an", and "the" as an antecedent refer to either the singular or plural. For example, "an aromatic dihydroxy compound" refers to either a single species of compound or a mixture of such species unless the context indicates otherwise.

The term "polycarbonate" refers to an oligomer or polymer comprising repeat units derived from at least dihydroxy compounds and carbonate compounds. The term "polycarbonate" encompasses poly(carbonate-coester) oligomers and/or polymers. Nothing in the description and claims of this application should be taken as limiting the polycarbonate to only one monomer residue unless the context is expressly limiting. Thus, the application encompasses copolycarbonates with residues of 2, 3, 4, or more types of dihydroxy monomer compounds.

The term "intermediate polycarbonate" as described herein with regard to the methods and reactor systems of the present invention is herein understood to mean a reaction mixture that has been treated under at least one series of melt polymerization conditions. One skilled in the art would understand what is meant by one series of melt polymerization conditions. In one embodiment, the intermediate polycarbonate will contain a polycarbonate polymer having a number average molecular weight (Mn) based upon polycarbonate standards measured by gel permeation chromatography (GPC) of 2,500 to 25,000 g/mol, for example 4,000 to 17,000 g/mol, and in some embodiments 7,000 to 14,000 g/mol. In some embodiments the intermediate polycarbonate will contain at least 200 ppm of branching structures referred to below. The intermediate polycarbonate can also contain unreacted reaction components (e.g. unreacted dihydroxy monomers and diaryl carbonate), reaction byproducts (e.g. phenol), and residual melt transesterification catalyst.

The term "product polycarbonate" as described herein with regard to the methods and reactors systems of the present invention is the product of the combination of the intermediate polycarbonate and the late-addition catalyst formulation after it has been further subjected to melt polymerization conditions. The product polycarbonate will have a higher molecular weight than the intermediate polycarbonate, a higher content of branching structures than the intermediate polycarbonate, or a combination thereof. Where the product polycarbonate has a higher content of branching structures than the intermediate polycarbonate in certain embodiments it will contain more than 500 ppm, more than 1,500 ppm, more than 2,500 ppm, more than 3,500 ppm, more than 4,500 ppm, or more than 5,500 ppm branching structures (for example less than 10,000 ppm, or 1,500 ppm to 4,500 ppm branching structures). Where the product polycarbonate has a higher molecular weight than the intermediate polycarbonate, in certain embodiments the product polycarbonate will have a number average molecular weight, Mn, measured relative to polycarbonate standards (GPC) of between 7,000 g/mol and 40,000 g/mol. In specific embodiments, the Mn of the product polycarbonate measured relative to PC is between 10,000 g/mol and 40,000 g/mol, for example between 12,000 g/mol and 40,000 g/mol. In another embodiment, the Mn (PC) is between 7,000 g/mol and 20,000 g/mol.

After the product polycarbonate has been prepared it can be subjected to additional and conventional processing or reaction steps. For example a catalyst quenching agent may be introduced to the product polycarbonate to deactivate the reactivity of the product polycarbonate and residual melt transesterification catalyst therein contained. The product polycarbonate may also, or alternatively be blended with processing additives such as mold release agents, UV stabilizers, impact modifiers, and/or coloring agents. In additional processing steps further reaction components (e.g. end cappers and/or additional catalyst) may be introduced to the product polycarbonate and the mixture further treated to polymerization/end-capping conditions with further modification of polymer characteristics.

The term "polycarbonate oligomer" refers to polycarbonate polymers having from 2 to 40 repeat units derived from at least dihydroxy compound(s).

The term "branching" refers to any and/or all of the following structures:

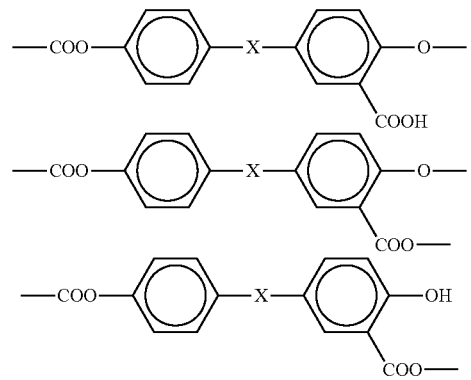

wherein X is

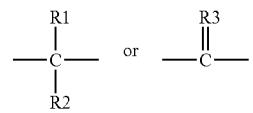

wherein R1 and R2 each independently represent a hydrogen atom or a monovalent linear or cyclic hydrocarbon group and R3 is a divalent hydrocarbon group.

The "late-addition catalyst formulation" refers to a melt transesterification catalyst dispersed in a liquid carrier system. In some embodiments the liquid carrier system will contain less than 10 wt % water. In other embodiments, the liquid carrier system comprises phenol, phenol and a cosolvent, phenol and less than 10 wt % water, phenol and a cosolvent and less than 10 wt % water. As noted, one or more cosolvents may be present with the phenol in the liquid carrier to aid in the dispersion of the melt transesterification catalyst in the formulation and its subsequent dispersion in the intermediate polycarbonate. In these embodiments, the liquid carrier system is present in an amount sufficient to transfer the melt transesterification catalyst in a free-flowing mixture that can be pumped and/or metered.

The term "disperse" as it relates to the melt transesterification catalyst in the late-catalyst formulation means that the catalysts is dissolved, melted, and/or suspended therein. In one embodiment the melt transesterification catalyst is dissolved in the liquid carrier system. In some embodiments component selection of the liquid carrier system and/or the temperature of the carrier liquid may be adjusted, such that the melt transesterification catalyst is dissolved therein. However, as noted above, it is desirable that the late-addition catalyst formulation is prepared, where possible, at reduced temperatures (e.g. at or near room temperature).

The term "suspended" as it is used above is herein understood to mean that the melt transesterification catalyst is not dissolved but is present therein in dispersed suspension. In one embodiment the melt transesterification catalyst is suspended in the carrier liquid for a long period of time such that a large quantity of the late-addition catalyst formulation can be prepared and used for days or weeks without stirring. In another embodiment the melt transesterification catalyst is temporarily suspended in the liquid carrier such that after it is suspended in the carrier liquid (e.g. by vigorous mixing) it can be transferred to the reaction components without settling out of mixture and clogging transfer lines or mixing equipment.

The term "reaction components" is herein understood to mean the materials used to effect a melt transesterification reaction between at least a dihydroxy compound and an diaryl carbonate to produce polycarbonate. These materials include at least melt transesterification catalyst(s), diaryl carbonate(s), and dihydroxy compound(s).

"ppm" for example when used as "ppm melt transesterification catalyst in the organic liquid carrier system" is herein understood to mean parts per million. For example 10 ppm melt transesterification catalyst in the late-addition catalyst formulation is 10 milligrams catalyst per kilogram of liquid carrier.

The term "finishing line" is herein understood to mean the portion of the reactor system where the intermediate polycarbonate is combined with a late-addition catalyst formulation and subjected to further melt polymerization conditions sufficient to create a product polycarbonate having desired and targeted specifications. The late-addition catalyst vessel is connected to the finishing line in a manner sufficient to introduce the late-addition catalyst formulation to the intermediate polycarbonate. The finishing line can contain one or more polymerization reactors operating under melt polymerization conditions. One or more additive vessels and processing/mixing devices may be connected to/employed on the finishing line in a manner sufficient to introduce and blend conventional additives with the polycarbonate in the finishing line. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The Reaction Components

A. The Dihydroxy Compound

The dihydroxy monomer compound, of the present invention is not particularly limited. The dihydroxy compound reacts with a diaryl carbonate to form monomer linkages within the polycarbonate chain. It is contemplated that the dihydroxy compound comprises aliphatic and/or aromatic diols and/or acids. Dihydroxy compounds suitable for use in the manufacture of polycarbonate by the melt transesterification process are well known in the art. For example, exemplary dihydroxy compounds suitable for use with the methods and systems of the present invention are detailed in any of U.S. Pat. Nos. 7,619,053, 7,671,165, and 7,547,799, which are incorporated herein by reference for all purposes. An often-used dihydroxy monomer compound is bisphenol A (BPA).

The Diaryl Carbonate:

In the present invention, diaryl carbonates react with the dihydroxy compounds to form carbonate linkages during the melt production of polycarbonate. Diaryl carbonate compounds suitable for use in the manufacture of polycarbonate are well known in the art and are not particularly limited. In the melt production of polycarbonate, the compounds which react with the monomer compounds to form carbonate linkages (the carbonate source) may be carbonate diesters, carbonyl halides, etc. Specific examples of diaryl carbonates include: diphenyl carbonate (DPC), ditolyl carbonate, bis (chlorophenyl) carbonate, m-cresyl carbonate, and dinaphthyl carbonate. Of the various compounds of this type DPC is often used. It is noted that where DPC is used as the diaryl carbonate, the liquid carrier of the late-addition catalyst formulation will desirably comprises phenol. Phenol is a reaction byproduct of the melt transesterification process where DPC is used as the diaryl carbonate. Use of phenol in the liquid carrier of the late-addition catalyst formulation has the benefit of introducing no new foreign material to the melt reaction process and thereby reduces separate byproduct stream purification steps.

It is noted, that the diaryl carbonate can also be derived from an activated diaryl carbonate or a mixture of an activated diaryl carbonate with non-activated diaryl carbonate. An often-used activated carbonate of the present invention is an activated diaryl carbonate such as bismethylsalicylcarbonate (BMSC). The term "activated diaryl carbonate" is defined as a diaryl carbonate which is more reactive than diphenyl carbonate toward transesterification reactions.

Specific examples of diaryl carbonates suitable for use in the present are illustrated in U.S. Pat. Nos. 7,151,189, 7,339,070, 7,619,053, and 7,629,432, which are incorporated herein for all purposes.

The Melt Transesterification Catalyst:

The melt transesterification catalyst used in the melt polymerization reaction to form intermediate and product polycarbonates of the present invention is not limited. Melt transesterification catalyst are well-known in the art and include at least one alpha and/or beta catalyst. Beta catalysts are typically volatile and degrade at elevated temperatures. Beta catalysts are therefore often used at early low-temperature polymerization stages. Alpha catalysts are typically more thermally stable and less volatile than beta catalysts and are useful in later high-temperature polymerization stages. However, certain types of beta catalysts are stable along the polymerization process conditions (including the high temperatures and reduced pressures) and can be used solely or also in combination with an alpha catalyst.

Alpha Catalysts:

The alpha catalyst can comprise a source of alkali or alkaline earth ions. The source of these ions includes alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Alkaline earth metal hydroxides are illustrated by calcium hydroxide and magnesium hydroxide. Of these sodium hydroxide is often used. The alpha catalyst typically will be used in an amount sufficient to provide between $1 \times 10^{-2}$ and $1 \times 10^{-8}$, preferably $1 \times 10^{-4}$ and $1 \times 10^{-7}$ moles of metal hydroxide per mole of the dihydroxy compounds employed.

Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. In one embodiment of the present invention the alpha catalyst comprises at least one alkali metal salt of a carboxylic acid, at least one alkaline earth metal salt of a carboxylic acid, or combinations thereof. In one embodiment of the present invention the alpha catalyst comprises $Na_2Mg$ EDTA or a salt thereof.

The alpha transesterification catalyst may also comprise one or more salts of a non-volatile inorganic acid. In one embodiment of the present invention the alpha catalyst comprises at least one salt of a non-volatile inorganic acid. Salts of non-volatile inorganic acids are illustrated by $NaH_2PO_3$, $NaH_2PO_4$, $Na_2HPO_3$, $KH_2PO_4$, $CsH_2PO_4$, and $Cs_2HPO_4$. The alpha transesterification catalyst may comprise one or more mixed alkali metal salts of phosphoric acid (e.g. $NaKHPO_4$, $CsNaHPO_4$, and $CsKHPO_4$). The alpha catalyst may also comprise one or more mixed alkali metal salts of carbonic acid (e.g. $Cs_2CO_3$).

Beta Catalysts:

Beta catalysts used in accordance with the present invention preferably comprise a quaternary ammonium compound, a quaternary phosphonium compound, or a mixture thereof. The quaternary ammonium compound can be an organic ammonium compound having the structure,

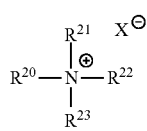

i.

wherein $R^{20}$-$R^{23}$ are independently a $C_1$-$C_{20}$ alkyl radical, $C_4$-$C_{20}$ cycloalkyl radical, or a $C_6$-$C_{20}$ aryl radical; and $X^-$ is an organic or inorganic anion, or combinations thereof. In one embodiment of the present invention anion $X^-$ is selected from the group consisting of at least one of the following: hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate, and tetrabutyl ammonium acetate.

In one embodiment, the quaternary phosphonium compound is an organic phosphonium compound having the structure,

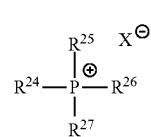

ii.

wherein $R^{24}$-$R^{27}$ are independently a $C^1$-$C^{20}$ alkyl radical, $C^4$-$C^{20}$ cycloalkyl radical, or a $C_6$-$C_{20}$ aryl radical; and $X^-$ is an organic or inorganic anion, or combinations thereof. In one embodiment of the present invention anion $X^-$ is an anion of at least one of the following: hydroxide, halide, alkoxide, aryloxide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetraphenyl phosphonium phenoxide. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $\frac{1}{2}$ ($CO_3^{-2}$).

The amount of beta catalyst employed is typically based upon the total number of moles of dihydroxy compound employed in the polymerization reaction. When referring to the ratio of beta catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1 \times 10^{-2}$ and $1 \times 10^{-5}$, preferably between $1 \times 10^{-3}$ and $1 \times 10^{-4}$ moles per mole of the dihydroxy compounds in the reaction mixture.

The Late-Addition Catalyst Formulation:

The methods and reactor systems described herein require the use of a late-addition catalyst formulation comprising a melt transesterification catalyst (at least one of an alpha and/or beta catalyst) dispersed in a liquid carrier system. As noted above, although water is an excellent solvent for melt polymerization catalysts, water can hydrolyze a polycarbonate terminal endgroups thereby decreasing molecular weight and/or endcapping content. In one embodiment, the late-addition catalyst formulation therefore preferably contain less than 10 wt % water, less than 5 wt % water, or in some embodiments no water. Water content can be measured using the Karl Fisher method. For example, sample can be introduced to a measuring vial and titrated with an automatic titrator equipped with a double polarized platinum electrode and a dosing device which accurately measures the iodine solution used. Equipment software then translates titration volumes into water content (ppm) and reports the ascertained value.

The melt transesterification catalyst is preferably present in the formulation in a range of 50 ppm to 60,000 ppm, more preferably in a range of 100 ppm to 5,000 ppm, for example in a range of 150 ppm to 2,000 ppm, and most preferably in a range of 200 to 1,500 ppm, for example between 200 ppm to 600 ppm.

In one embodiment, the methods and reactor systems utilize a late-addition catalyst formulation which includes a melt transesterification catalyst dispersed in an organic liquid carrier system comprising phenol and a cosolvent. The formulation contains less than 10 wt % water and the melt transesterification catalyst is present in the formulation in a range of 50 ppm to 20,000 ppm.

In one embodiment, the organic liquid carrier system includes phenol and a cosolvent. Like phenol, the cosolvent is preferably also organic. The weight ratio of phenol to cosolvent can in a range of 1:3 to 3:1, or in a range 1:2 to 2:1, for example in a range of 1:2 to 1:1. Since phenol is known to react with the polycarbonate chain to reduce molecular weight and/or create undesired end groups lower amounts of phenol are sometimes desired. In such instances a ratio of phenol to cosolvent is most preferable in a range of 1:3 to 1:1, for example less than 1:1 (e.g. 1:2).

In some embodiments, the cosolvent will be inert with respect to the materials in the reaction mixture and is stable at melt polymerization conditions. Non-limiting examples of suitable cosolvents include dimethylcarbonate, benzene, xylene, and/or toluene. Where the organic liquid carrier comprises both phenol and toluene, the weight ratio of phenol to toluene is preferably in a range of 1:3 to 3:1, for example 1:2 to 2:1 (e.g. 1:2 to 1:1).

In another embodiment the cosolvent will contain a non-foreign material to the melt reaction process (e.g. monomer and polymerization processes) so as to minimize recycling purification steps after the liquid carrier is removed from the reaction materials and product polycarbonate. Where the solvent is selected to be a non-foreign material in the melt reaction process, anisole has been found to be satisfactory. Where the organic liquid carrier comprises both phenol and anisole, the weight ratio of phenol to anisole is preferably in a range of 1:3 to 3:1, for example 1:2 to 1:1 (e.g. either 1:1 or 1:2).

In one embodiment, the components and weight ratios thereof in the organic liquid carrier system are preferably selected such that the melt transesterification catalyst is dispersed therein to provide a free flowing mixture that can be easily transferred and introduced to an intermediate polycarbonate. In another embodiment, the components and weight ratios thereof are selected such that the melt transesterification catalyst is dissolved in the formulation.

Melt transesterification catalysts have been found to degrade at elevated temperatures over time, and particularly in the presence of phenol (e.g. a byproduct of the reaction process). This leads to color formation in the product polycarbonate. Therefore, another benefit of the present late-addition catalyst formulation having an organic liquid carrier is that it can be prepared and maintained at or near room temperature (e.g. about 15° C. to 20° C., for example at a room temperature of 18° C.). Since dispersion and/or dissolution of the melt transesterification catalysts can be affected by the temperature of the liquid carrier it is possible to prepare the reaction mixture by heating to a temperature above room temperature with stirring. In such a scenario it is desirable that once the melt transesterification catalyst has been dispersed in the organic carrier liquid to produce the late-addition catalyst formulation, the temperature of the formulation is lowered and/or maintained at a stable temperature, with optional mixing, where the melt transesterification catalyst remains dispersed (e.g. it does not precipitate or settle out of dispersion). In certain embodiments the late-addition catalyst formulation is maintained and introduced to an intermediate polycarbonate at the stable temperature (e.g. at or near room temperature).

As noted herein, it has also been found that the late-addition catalyst formulation having an organic liquid carrier comprising phenol and a cosolvent allows for the efficient addition of melt transesterification catalysts to the polymerization process after molecular weight of the polycarbonate has been built. In particular the late-addition catalyst formulation, has been found to disperse within an intermediate polycarbonate to provide sufficient catalytic activity without the need of a separate mixer or mixing step prior to continued polymerization.

The Reactor Systems and Methods:

Melt production processes are well known in the art for producing polycarbonate by reacting a diaryl carbonate (e.g. DPC) and a dihydroxy compound (e.g. BPA) in the presence of melt transesterification catalysts. One skilled in the art, after reading the present disclosure, will be able to readily select acceptable operating conditions of the reactor systems and methods herein described. For example standard operating temperatures of reactor equipment in a melt production facility range from 50° C. to 500° C. The higher the temperature the faster the polymerization reaction. However, one skilled in the art will understand that as temperature increases undesired reaction byproducts may be formed and incorporated within the product polycarbonate and reaction components can be degraded.

A prior art melt polymerization reactor system 100 and method of forming melt polycarbonate is depicted in FIG. 1 and described below. A reaction mixture or individual reaction components are introduced 101 to one or more mix and oligomerization vessel(s) 103. The reaction components may be introduced together as a reaction mixture via a single stream 101 or the reaction mixture may be formed therein by adding reaction components or combinations thereof via separate streams. The reaction components will typically include a dihydroxy compound, a diaryl carbonate, and a melt transesterification catalyst containing an alpha catalyst and beta catalyst. The reaction components are treated in the mix and oligomerization vessel 103 under melt polymerization conditions sufficient to form polycarbonate oligomer.

The reaction mixture is then introduced 107 to a series of polymerization reactors 109, 111 operating under melt polymerization conditions to build polycarbonate molecular weight and finally to produce product polycarbonate 113 having desired characteristics. The product polycarbonate 113 may optionally be combined with any well-known additives such as impact modifiers, UV stabilizers, fire retardants, colorants, or the like in a post production mixing/extrusion step.

In FIG. 1 the series of polymerization reactors include a polymerizer reactor 109 and a finishing polymerizer 111. The front-end reaction components 101 and operating conditions of the polymerization reactor 109 and finishing polymerizer 111 are selected such that the product polycarbonate 113 exiting the finishing polymerizer 111 has desired characteristics.

As the melt reaction progresses, reaction byproducts are generated and removed via streams 105 from the reactor system. Streams 105 are preferably connected to a vacuum system to aid in separation of volatile products from the reaction mixture in order to drive the reaction toward completion. The reaction byproducts streams 105 will include a diaryl carbonate byproduct (e.g. phenol when DPC is used) and may also include unreacted reaction components including dihydroxy monomer, diaryl carbonate, and melt transesterification catalysts. Reaction byproduct streams 105 can be collected, purified, and/or separated to produce streams of reaction components that can be reused in the polycarbonate manufacture process or other processes.

When a polycarbonate having different characteristics is desired, the selection of reaction components and/or operating conditions of the polymerization reactor 109 and/or finishing polymerizer are altered. During changeover to the new polycarbonate specifications, the melt production facility depicted in FIG. 1 must be purged of transition material until the new product polycarbonate 113 exiting the finishing polymerizer consistently meets the desired specifications.

As noted above the present invention is premised, in part, upon the finding that an intermediate polycarbonate feedstock can be prepared that is suitably used in supplemental reaction steps in the presence of supplemental catalyst and varying reaction conditions to produce a broad range of product polycarbonates in one or more finishing lines. The product polycarbonate(s) exiting the one or more finishing lines are differentiated by from the intermediate polycarbonate feedstock and optionally each other by, inter alia, molecular weight and/or branching content. The intermediate polycarbonate is prepared by treating a dihydroxy compound, a diaryl carbonate, and a melt transesterification catalyst under melt polymerization conditions sufficient to build a polycarbonate with a number average molecular weight (Mn) based upon polycarbonate standards (GPC) of 2,500 to 25,000 g/mol. The intermediate polycarbonate then can be divided/diverted into one or more finishing lines to which a late-addition catalyst formulation is introduced. The combined mixture then can be further treated to increase molecular weight and/or branching content to produce product polycarbonate.

The reactor systems and methods of the present invention provide the ability to produce a broad range of polycarbonate grades from the same starting dihydroxy and diaryl carbonate components while minimizing waste and maximizing plant efficiency. It is a particular benefit of the present reactor systems and methods to be able to prepare the intermediate polycarbonate feedstock having desired characteristics (e.g. low to medium molecular weight and/or fries content) and thus reduced viscosity, energy inputs, and material transfer protocols in the early reactors of the melt polymerization plant. Then the final build up of molecular weight, branching content, and/or end-capping can occur in the finishing line(s) which include the final reactors of the plant. Specific methods and reactor systems of the present invention will be discussed hereafter.

Figure 2A:
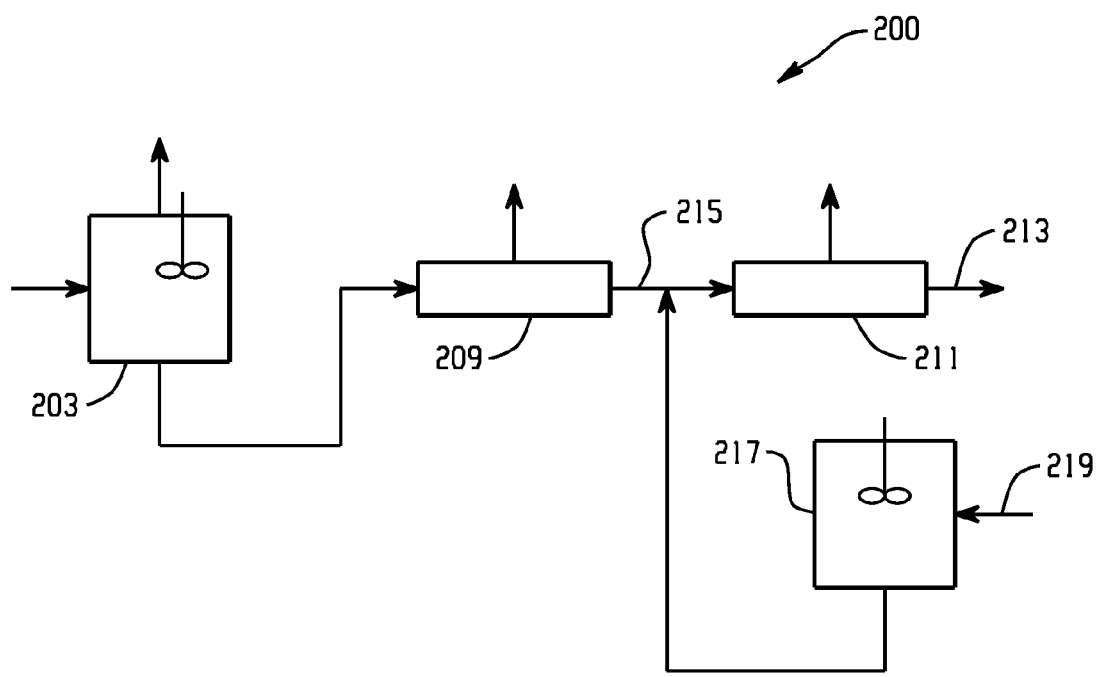
FIGS. 2A, 2B, and 3 show melt polymerization reaction systems illustrating various embodiments of the present invention.

Depicted in FIG. 2A is a reactor system 200 according to the present invention for producing a product polycarbonate 213. The reactor system 200 has a polymerization reactor 209, a first finishing line 215 having a first finishing polymerizer 211, and a late-addition catalyst vessel 217 containing a late-addition catalyst formulation described above. The late-addition catalyst formulation can be formed in the late-addition catalyst vessel 217 by adding 219 and mixing the specific components. In the alternative, the formulation can be prepared offsite and subsequently transferred 219 to the late-addition catalyst vessel 217.

The first finishing line 215 is connected to the polymerization reactor 209. The late-addition catalyst vessel 217 is connected to the first finishing line 215 at the first finishing polymerizer 211 or between the first finishing polymerizer 211 and the polymerization reactor 209. Preferably the late-addition catalyst vessel 217 is connected to the first finishing line 215 at the inlet of the first finishing polymerizer 211. It is noted that when the late-addition catalyst formulation comprises the organic liquid carrier described above (e.g. melt catalyst dispersed in the organic liquid carrier system comprising phenol and a cosolvent), although it could be used, there is no requirement for the presence of a separate mixer (e.g. a static mixer) or mixing step between the late-addition catalyst vessel and the next polymerizer. Otherwise, use of a static mixer or mixing step could prove beneficial to ensure dispersion of the melt transesterification catalyst within the intermediate polycarbonate to provide satisfactory catalytic activity to increase molecular weight and/or branching content in the remaining reactors.

The reactor system preferably includes oligomerization/mix vessel(s) 203 similar to those described above for mixing reaction components and forming the reaction mixture for use in the polymerization reactor 209. The reaction components introduced to the polymerization reactor 209 include a dihydroxy compound, a diaryl carbonate, and an early-addition catalyst. Where an oligomerization vessels 203 is employed, the reaction mixture introduced to the polymerization reactor 209 will also contain a polycarbonate oligomer. The early-addition catalyst contains an alpha catalyst, a beta catalyst, or both an alpha and beta catalyst.

The polymerization reactor 209 is operated under melt polymerization conditions sufficient to build an intermediate polycarbonate. The intermediate polycarbonate will contain polycarbonate having a number average molecular weight on polycarbonate basis (GPC) of 2,500 and 25,000 g/mol, preferably 4,000 to 17,000 g/mol, and more preferably 7,000 to 14,000 g/mol and/or an amount of branching of at least 200 ppm. The intermediate polycarbonate can then be used as a feedstock for use in the first finishing line 215. In the first finishing line, polycarbonate molecular weight is built to produce a product polycarbonate having higher molecular weight than the intermediate polycarbonate, a branching reaction occurs to create a higher content of branching structures, or both.

As noted above, the intermediate polycarbonate may contain residual reaction components. For example the intermediate polycarbonate may contain residual melt transesterification catalyst. In one embodiment, where residual melt transesterification catalyst is present in the intermediate polycarbonate the amount and/or type of late-addition catalyst introduced to the intermediate polycarbonate can be selected to increase concentration of the specific catalyst or introduce a new/different melt transesterification catalyst to the reaction mixture. This can be accomplished for example by employing a late-addition catalyst formulation with a higher concentration of catalyst or a different melt catalyst than the intermediate polycarbonate and selecting an corresponding flow rate of the formulation to the intermediate polycarbonate. In another embodiment where DPC is used as the diaryl carbonate, the intermediate polycarbonate exiting the first polymerizer may contain the reaction byproduct phenol. In this embodiment, and where the late-addition catalyst formulation comprises phenol in the liquid carrier, the flow rate and component concentration of the late-addition catalysts formulation can be selected such that the amount of phenol introduced to the intermediate polycarbonate, via the addition of the late-addition catalyst formulation is less than, equal to, or greater than the amount of residual phenol in the intermediate polycarbonate exiting the first polymerizer.

Figure 3:
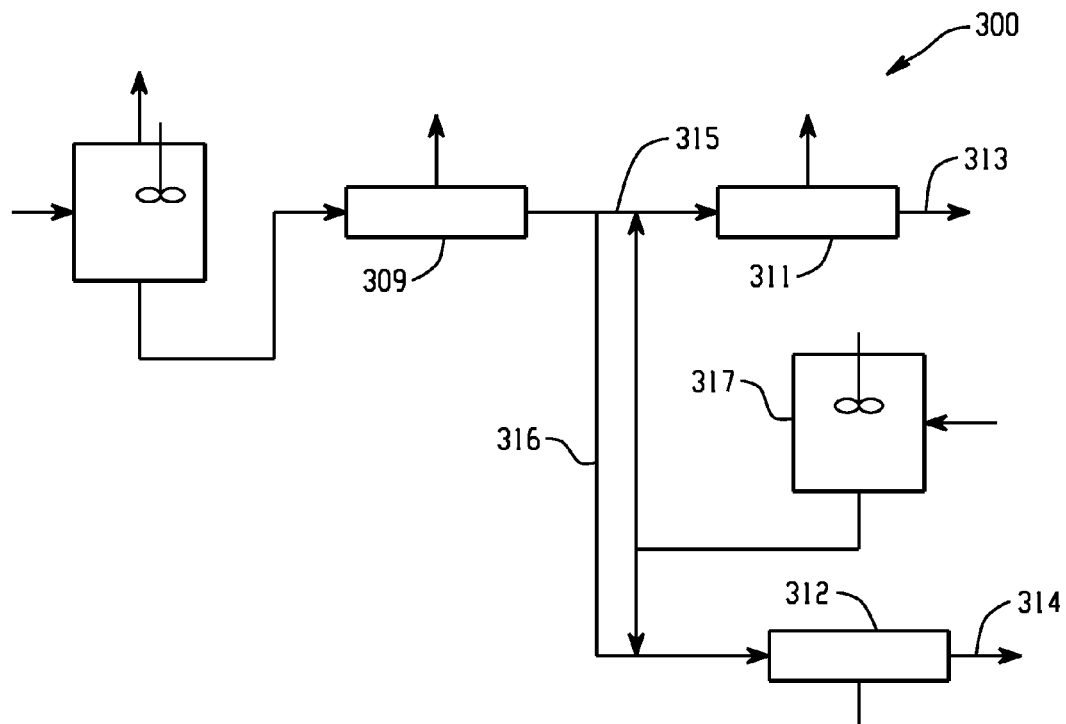

In another embodiment shown in FIG. 3 the reactor system 300 of the present invention may have more than one finishing line 315 connected to the polymerization reactor 309. In this embodiment a second finishing line 316 has a second finishing polymerizer 312. The first finishing line 315 and second finishing line 316 are connected in parallel to the polymerization reactor 309. The late-addition catalyst vessel 317 is connected to each of the first 315 and second 316 finishing lines at its respective finishing polymerizer 311, 312, between the respective finishing polymerizer 311, 312 and the polymerization reactor 309, or a combination thereof. The flow rate of late-addition catalyst formulation from the late-addition catalyst vessel 317 to each of the finishing lines can be the same or different. Furthermore, the operating conditions of the finishing polymerizers 311, 312 can be the same or different. The selection of the flow rate of the late-addition catalyst formulation to each finishing line and the selection of operating conditions of the finishing polymerizers 311, 312, allow for the production of different product polycarbonate 313, 314 having different characteristics. After reading and understanding the present disclosure, one skilled in the art will be able to readily select necessary reaction parameters including, inter alia, reactor operating conditions, flow rates, early and late catalysts, and concentrations sufficient to produce an intermediate polycarbonate having desired characteristics and product polycarbonates exiting the finishing lines that have other desired characteristics.

In further embodiments, 3, 4, 5, or more finishing lines can also be connected in parallel to the polymerization reactor 309. In these further embodiments the late-addition catalyst tank 317 can be connected to the additional finishing lines in a fashion similar to the connection with the first 315 and second 316 finishing lines. Alternatively, an additional late-addition catalyst tank or tanks may be employed which contain different late-addition catalyst formulations (e.g. one that has a different catalyst or concentration, different solvent/cosolvent, and/or different solvent/cosolvent ratio). These later embodiments provide for even greater flexibility in producing a wide range of product polycarbonate using the same intermediate polycarbonate feedstock from the polymerization reactor 309. For example each of the additional late-addition catalyst tanks may contain different catalysts and concentrations that are the same or different from the catalyst used in the formation of the intermediate polycarbonate.

The amount of late-addition catalyst formulation added to the intermediate polycarbonate is selected such that the late-addition catalyst has a catalytic effect to build polycarbonate molecular weight and/or increase branching content. The amount of melt transesterification catalyst introduced to the intermediate polycarbonate in its respective finishing line will be dependent on the concentration of melt transesterification catalyst in the late-addition catalyst formulation and the flow rate of the formulation to the intermediate polycarbonate in the finishing. In some embodiments the amount of melt-transesterification catalyst added will be sufficient to introduce 10 parts per billion (ppb) to 2,000 ppb, 20 ppb to 1,000 ppb, 50 ppb to 500 ppb, 75 ppb to 250 ppb (e.g. 95 ppb) late-addition catalyst to the intermediate polycarbonate. In another embodiment, where the melt transesterification catalyst in the late-addition catalyst formulation comprises an alpha catalyst it will preferably be added in an amount sufficient to provide between $1\times10^{-2}$ and $1\times10^{-8}$, preferably $1\times10^{-4}$ and $1\times10^{-7}$ moles of metal hydroxide per mole of the dihydroxy compound used in forming the intermediate polycarbonate. In another embodiment, where the melt transesterification catalyst in the late-addition catalyst formulation comprises a beta catalyst it will preferably be added in an amount sufficient to provide a range between $1\times10^{-2}$ and $1\times10^{-5}$, preferably between $1\times10^{-3}$ and $1\times10^{-4}$ moles per mole of the dihydroxy compound used in forming the intermediate polycarbonate. Based upon the teachings herein contained, the amount of catalyst introduced and the concentration and flow rate of the late-addition catalyst formulation can be readily determined by one skilled in the art.

Figure 2B:
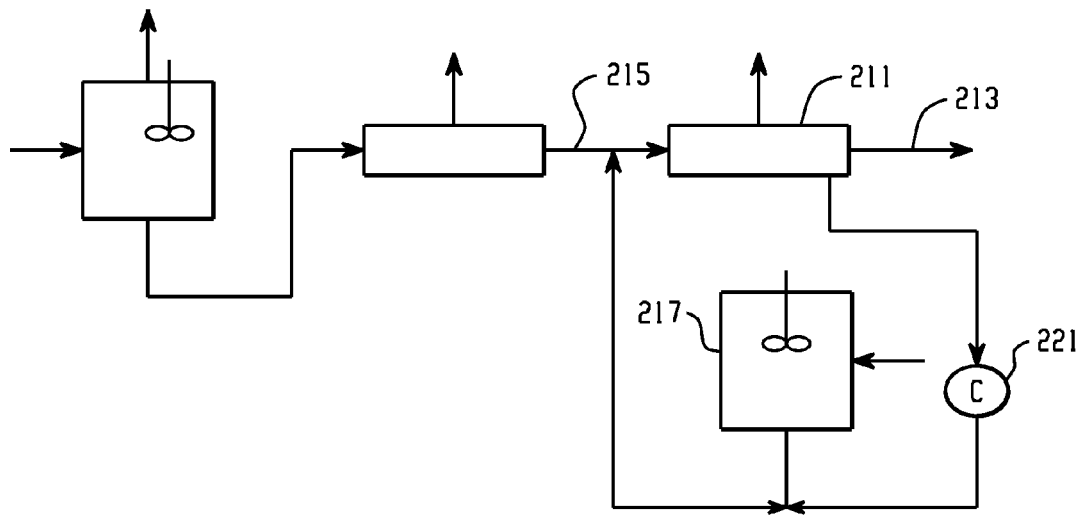

Next, as show in FIG. 2B, a control system 221 for controlling the flow rate of the late-addition catalyst formulation from the late-addition catalyst tank 217 to a finishing line can be employed. Similar control systems are preferably employed where the reactor system has more than one finishing line (e.g. 316 in FIG. 3) and/or more than one late-addition catalyst tank can likewise be employed. In one embodiment the control system(s) 221 is configured to accomplish the following tasks:
  (i) determine a characteristic of the product polycarbonate 213 exiting a finishing polymerizer 211,
  (ii) compare the determined characteristic with a desired characteristic of the product polycarbonate 213 exiting the finishing polymerizer, and
  (iii) determine and meter a flow rate of the late catalyst addition formulation from the late-addition catalyst vessel 217 to the finishing line 215 based upon the comparison made in step (ii) so that the product polycarbonate 213 has the desired characteristic.

The control system 221 is preferably operable to determine a characteristic of the product polycarbonate 213 by receiving a signal from the finishing polymerizer 211 that is representative of its operating temperature, pressure, electrical consumption, torque, or any combination thereof. This received signal (e.g. electrical, pneumatic, etc.), or other received signal, can be correlated to a specific characteristic of the polycarbonate within the finishing polymerizer 211. For example the signal can be correlated to the polycarbonate's molecular weight, level of polycarbonate's terminal endcapping, level of polycarbonate's branching, or any combination thereof.

The received signal can be compared against a known signal value that is indicative of a desired characteristic of the product polycarbonate 213. The control system 221 can then determine, adjust, and meter/dispense a flow rate of the late-addition catalyst formulation from the late-addition catalyst vessel 217 (e.g. by increasing/decreasing pump speed and/or by opening/closing a flow control valve) until the received signal is at or near the known value of the desired characteristic. The control system 221 of the present invention can be employed to ensure the product polycarbonate 213 meets control tolerances. The control system of the present invention can be suitably implemented using a programmable controller or programmable logic controller or other known controllers for controlling chemical reaction processes.

The present invention also provides for the ability to use different melt transesterification catalysts at different points in the melt polymerization process. For example the early-addition catalyst used in the oligomerization vessel 203 and/or polymerization reactor 209 might include a melt transesterification catalyst (e.g. an alpha, a beta catalyst, or both an alpha and a beta catalyst) which is selected to produce an intermediate polycarbonate having certain characteristics at early stages of the reactor system. The melt transesterification catalyst of the late-addition catalyst formulation can then be selected for the finishing stages of polymerization to produce a product polycarbonate 213 having the specified characteristics for market. In this regard, a low branch and/or low branching catalyst system may be selected for the early-addition catalyst to produce the intermediate polycarbonate feedstock having low branching content. This low branch intermediate polycarbonate feedstock then can be introduced to the finishing line(s) along with a selected late-addition catalyst at a specified flow rate. The operating conditions of the reactor(s) in the finishing line(s), the late-addition catalyst, and the flow rate of the late-addition catalyst can be selected to produce a wide range of polycarbonates using the same intermediate polycarbonate feedstock.

It is noted that a polycarbonate's branching content will generally increase as molecular weight increases. However, certain catalysts can be selected which specifically target a build up of branching content without an increase in molecular weight or even with a decrease in molecular weight (e.g. due to solvent interaction with the intermediate polycarbonate). In certain embodiments: the product polycarbonate will have a lower molecular weight but higher content of branching than the intermediate polycarbonate; the product polycarbonate will have the same molecular weight but higher content of branching than the intermediate polycarbonate; the product polycarbonate will have a higher molecular weight and higher content of branching than the intermediate polycarbonate; the product polycarbonate will have a higher molecular weight and the same or only a slightly (e.g. 10 ppm-500 ppm) higher content of branching that the intermediate polycarbonate.

In accordance with this embodiment, the melt transesterification catalyst selected as the early-addition catalyst is different from the melt transesterification catalyst of the late-addition catalyst formulation. In one such embodiment, the melt transesterification catalyst of the early and late-addition catalyst formulations each comprise a source of alkali metal ions, alkaline earth metal ions, or both alkali earth metal ions and alkali metal ions. For example, in one such embodiment, the early-addition catalyst comprises an alpha catalyst including alkali metal salt of a phosphoric acid, an alkaline earth metal salt of a phosphoric acid, or combinations thereof, and the melt transesterification catalyst of the late-addition catalyst formulation system comprises an alpha catalyst selected from the group consisting of at least one of the following: an alkali metal hydroxide, an alkali earth metal hydroxide, an alkali metal carbonate, an alkali earth metal carbonate, an alkali metal salt of a carboxylic acid, and an alkaline earth metal salt of a carboxylic acid. For example the alpha catalyst selected as the early-addition catalyst comprises $NaKHPO_4$ and the alpha catalyst of the late-addition catalyst formulation comprises NaOH.

In another such embodiment, the melt transesterification catalyst selected for the early-addition catalyst includes an alpha catalyst while the melt transesterification catalyst of the late-addition catalyst formulation comprises a beta catalyst or a beta catalyst combined with an alpha catalyst. In a further embodiment, the melt transesterification catalyst of the early-addition catalyst can include a beta catalyst while the melt transesterification catalyst of the late-addition catalyst formulation comprises an alpha catalyst. In yet another embodiment, the melt transesterification catalyst of the early-addition catalyst can include a beta catalyst while the melt transesterification catalyst of the late-addition catalyst formulation comprises the same or different beta catalyst.

All embodiments described above can be translated into method steps. In one such embodiment, the present invention provides a method of producing a product polycarbonate using the late-addition catalyst formulations described above. The method includes the steps of:

(i) treating a plurality of reaction components under melt polymerization conditions sufficient to produce an intermediate polycarbonate having a number average molecular weight (Mn) based upon polycarbonate standards (GPC) of 2,500 to 25,000, wherein the plurality of reaction components comprise a dihydroxy compound, a diaryl carbonate, and a melt transesterification catalyst, (ii) introducing a late-addition catalyst formulation to the intermediate polycarbonate produced in step (I) in an amount effective to catalyze molecular weight build, a branching reaction, or both molecular weight build and a branching reaction, the late-addition catalyst formulation comprising a melt transesterification catalyst dispersed in a liquid carrier system, (iii) treating the intermediate polycarbonate and late-addition catalyst formulation from step (ii) under melt polymerization conditions sufficient to produce a product polycarbonate, wherein the product polycarbonate has a higher molecular weight or a higher content of branching structures than the intermediate polycarbonate formed in step (i), or both, thereby producing a product polycarbonate.

Examples

Having described the invention in detail, the following examples are provided. The examples should not be considered as limiting the scope of the invention, but merely as illustrative and representative thereof.

In the following examples different techniques were used to analyze results. In some situation Box Plots were used to depict results. Box Plots are a graphical representation of an analysis of variance (ANOVA), which tests the hypothesis that the means of two or more populations are equal. ANOVAs evaluate the importance of one or more factors by comparing the response variable means at the different factor levels. The null hypothesis states that all population means (factor level means) are equal while the alternative hypothesis states that at least one is different. To run an ANOVA, you must have a continuous response variable and at least one categorical factor with two or more levels. ANOVAs require data from normally distributed populations with roughly equal variances between factor levels. If the p-value is less than the alpha (typically 0.05), then the null hypothesis can be rejected.

The name "analysis of variance" is based on the manner in which the procedure uses variances to determine whether the means are different. The procedure works by comparing the variance between group means versus the variance within groups as a method of determining whether the groups are all part of one larger population or separate populations with different characteristics.

Bonferroni confidence intervals are also used herein to analyze test results. This is a method for controlling the simultaneous confidence level for an entire set of confidence intervals. It is important to consider the simultaneous confidence level when examining multiple confidence intervals because your chances that at least one of the confidence intervals does not contain the population parameter is greater for a set of intervals than for any single interval. To counter this higher error rate, Bonferroni's method adjusts the confidence level for each individual interval so that the resulting simultaneous confidence level is equal to the value you specify (typically 95%).

Figure 4:
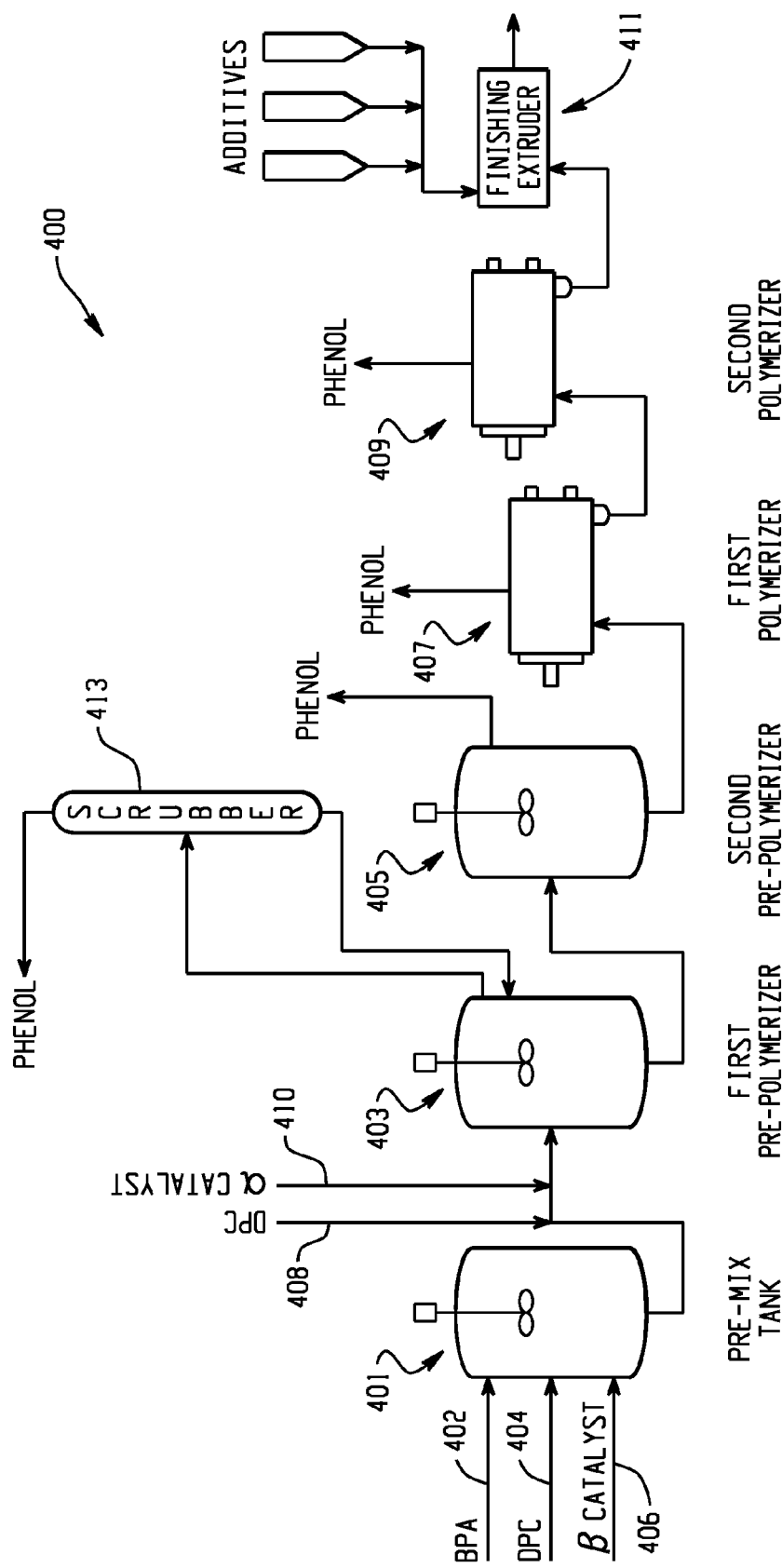
FIGS. 4 and 5 shows melt polymerization reaction systems used in the example section.

Experiments were run in a continuous melt polycarbonate plant 400, a schematic of which is shown in FIG. 4. In the experiments 39.8 kg/h Bisphenol-A (BPA) 402 and 37.3 kg/h of diphenylcarbonate (DPC) 404 were fed into a continuously stirred vessel (formulation tank) 401. The formulation tank 401 was operated at atmospheric pressure and between 160° C. and 180° C. A 3.2% (wt) aqueous solution of the onium type/beta catalyst (e.g. tetrabutyl phosphonium acetate) 406 was also added to the vessel at a rate of 75 to 95 ml/h, providing an equilibrated mixture of unreacted monomers, phenol and low molecular oligomers.

The outlet stream of the formulation tank was then pumped to a continuously stirred reactor (first reactor) 403, which was operated at 240 to 270° C. and 150 to 200 mbar vacuum so that reaction byproduct, phenol, is removed. The vapor phase containing phenol and unreacted monomers BPA and DPC is continuously distilled in a scrubber 413 where reflux ratio is adjusted so that the column head temperature will be 125 to 130° C. to yield high purity phenol and thus recovering the unreacted BPA and DPC back into the first reactor 403. In order to compensate for the DPC losses in the phenol overhead streams of the forthcoming reactors, an additional stream of DPC 408 was added to the first reactor at 0.9 to 1.35 kg/h. An early-addition catalyst containing alpha catalyst (e.g. an aqueous stream of 50 ppm $KNaH_2PO_4$) 410 is also added in the first reactor at a typical flow rate of 1.0 to 1.8 ml/min The outlet stream of the first reactor 403 is then pumped to a second stirred reactor 405 where 270 to 285° C. and 35 to 40 mbar vacuum were applied to further displace the reaction equilibrium and drive the reaction forward. Due to the higher viscosity of this stream a gear pump (not shown) is used to convey the stream to the forthcoming polymerization section where two horizontal polymerization reactors 407, 409 connected in series are used to reach the final viscosity target.

First horizontal polymerization reactor 407 operates at 285 to 302° C. and 2.5-3.0 mbar vacuum. Phenol is removed due to the process conditions applied and the reaction mixture therein is continuously agitated by a spectacle-blade type agitator running at 20 rpm. The polymer stream exiting reactor 407 is then pumped to the next polymerizer 409 where a deeper (1.0-1.5 mbar) vacuum and 288 to 305° C. are set to further build polycarbonate viscosity. Second polymerizer 409 has a lattice-type agitator run at 8 rpm to promote polymer surface renewal and thus phenol devolatilization to produce product polycarbonate.

Figure 5:
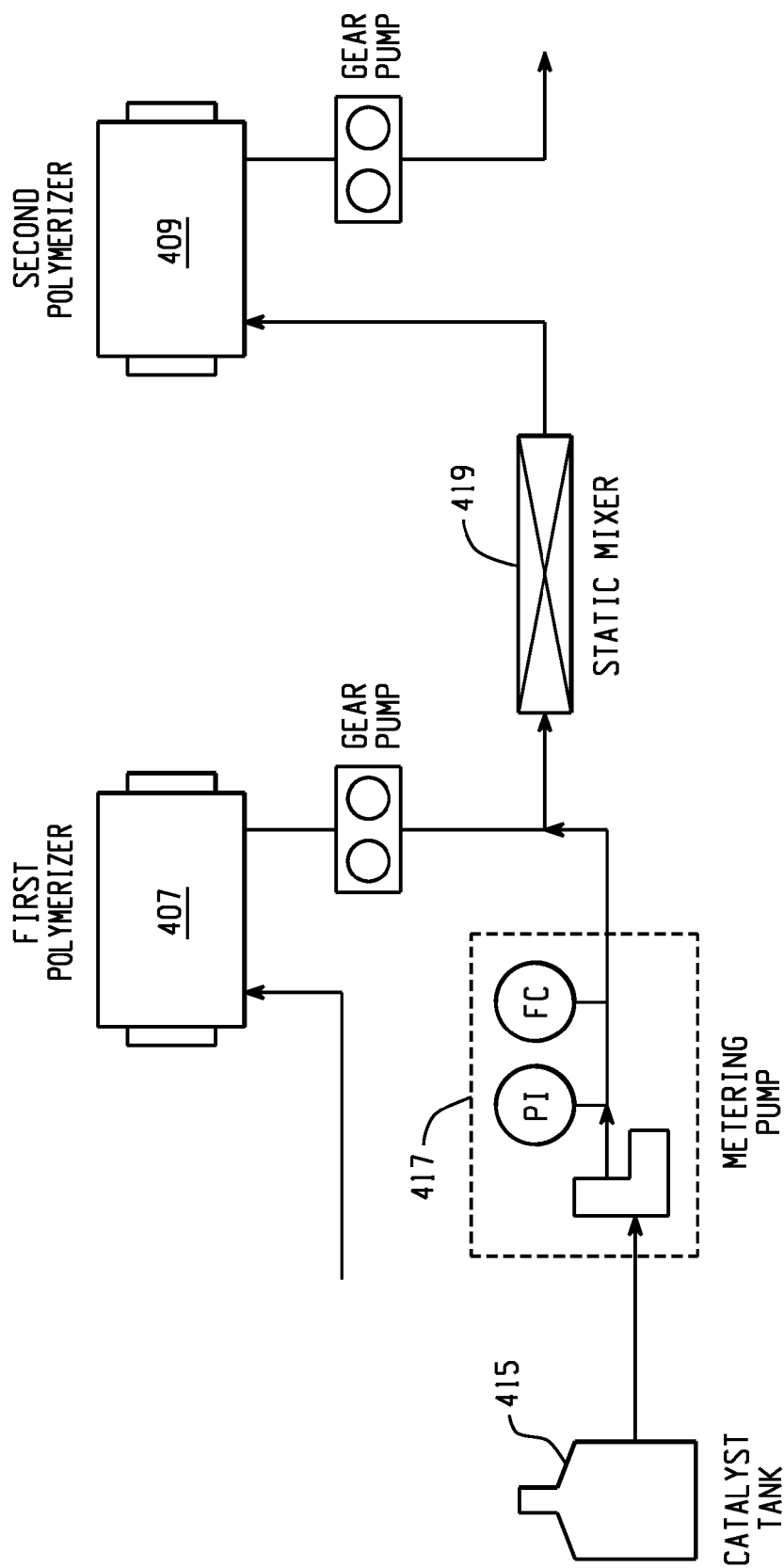

The product polycarbonate exiting the second polymerizer 409 is then optionally introduced to a six-barrel twin-screw extruder (L/D=21, d=44 mm) 411 to mix polymer additive additives for specific applications. In the extrude 411 Barrel temperature is set a 300° C. and screw runs at 100 rpm. Polycarbonate exiting the extruder is filtered and pelletized.

Where late-addition catalyst experiments were run, the formulation was prepared and added between the first 407 and second 409 polymerizers. As shown in FIG. 5 the late-addition catalyst formulation from a late-addition catalyst tank 415 can be introduced via metering and control system 417 (e.g. Program logic and flow control of HPLC type dosing pump supplied by Agilent (1100 Series)) to the polycarbonate reaction mixture between the polymerizers. Furthermore, a separate static mixer 419 may optionally be employed to ensure superior mixing.

Illustration A:

A first series of experiments were run using a static mixer 419 downstream from the addition point of the late-addition catalyst formulation. NaOH was used as the catalyst in the formulation to increase the branching content of the polycarbonate. Initially water was used as catalyst carrier and 95 ppb of Na were added at two different solution concentrations (500 and 200 ppm) so that catalyst flow added was in one run 0.2 ml/min and in a second run 0.5 ml/min Table 1 compares the results obtained in these two runs with the case of adding no late-addition catalyst. The data shows that despite adding the same catalyst loading the level of branching only increased when adding 0.5 ml/min These results indicate that when an aqueous matrix is used to introduce the late catalyst, the effectiveness of the late addition is decreased at low addition flow rates (for constant same amount of Late catalyst added). In aqueous matrix, higher flows are needed for the catalyst to show effectiveness in catalyzing reaction. It is believed that this is caused by poor dispersion and mixing of aqueous solution into the polymer stream.

TABLE 1

Comparison of branching level using aqueous solutions at different flow rates

| Run Conditions | Branch ppm (Avg) | Branch Content (STDEV) |
|---|---|---|
| No Late Catalyst | 1404 | 138 |
| 95 ppb in Aqueous Solution - 0.2 ml/min | 1443 | 158 |
| 95 ppb in Aqueous Solution - 0.5 ml/min | 1959 | 173 |

Illustration B:

A second series of experiments were run using NaOH as branch-inducing late-addition catalyst conveyed in a organic solution of 64.4% (wt) phenol, 32.2% (wt) toluene and 3.4% (wt) aqueous solution of NaOH. 95 ppb Na were added to the polymer stream at two different NaOH concentrations (15000 and 6000 ppm), so that in the first experiment the catalyst stream was 0.2 milliliters per minute (ml/min) and in the second experiment it was 0.5 ml/min. Table 2 compares the levels of branching obtained at the two different flow rates of late addition catalyst after the third reactor. The data shows same branching levels regardless of flow rate added.

Figure 6:
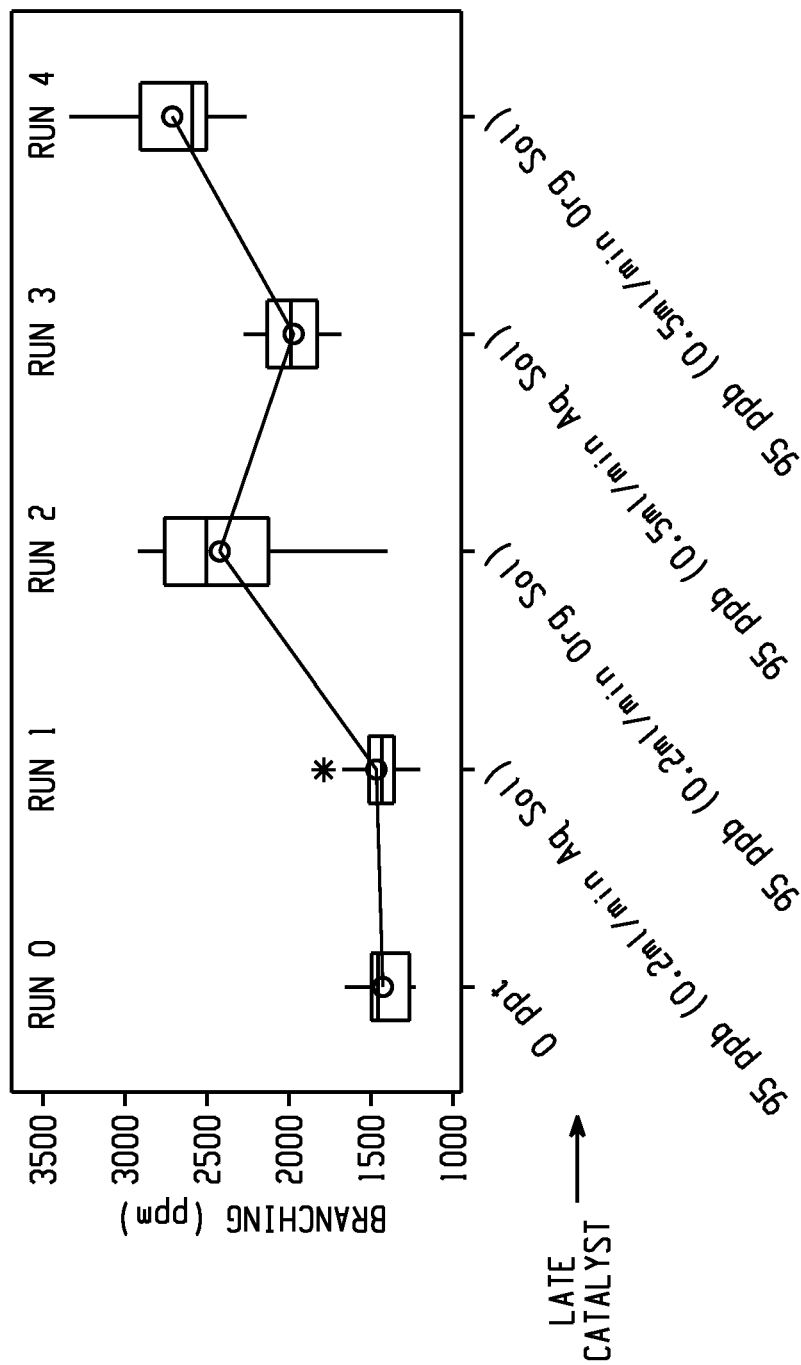
FIG. 6 shows a comparison of branching levels at different late-addition catalyst formulation and flow rates of Illustrations A and B in the example section.

When compared to Illustration A, as shown in FIG. 6, the use of an organic matrix to carry the catalyst into the polymer stream is proven to be much more effective at any addition flow rate (keeping ppb of NaOH added into polymer constant) vs. aqueous matrix.

TABLE 2

Comparison of branching level using organic matrix at different flow rates.

| Run Conditions | Branch ppm (Avg) | Branch Content (STDEV) |
|---|---|---|
| No Late Catalyst | 1404 | 138 |
| 95 ppb in Organic Matrix - 0.2 ml/min | 2413 | 421 |
| 95 ppb in Organic Matrix - 0.5 ml/min | 2689 | 302 |

FIG. 6 shows Box plots comparing the four above mentioned runs in both Illustrations A and B and shows that for the same catalyst loading and same catalyst flow rate, the level of activity achieved by the late catalyst addition, measured by branching level, is higher with the organic matrix than with the aqueous solution.

Figure 7:
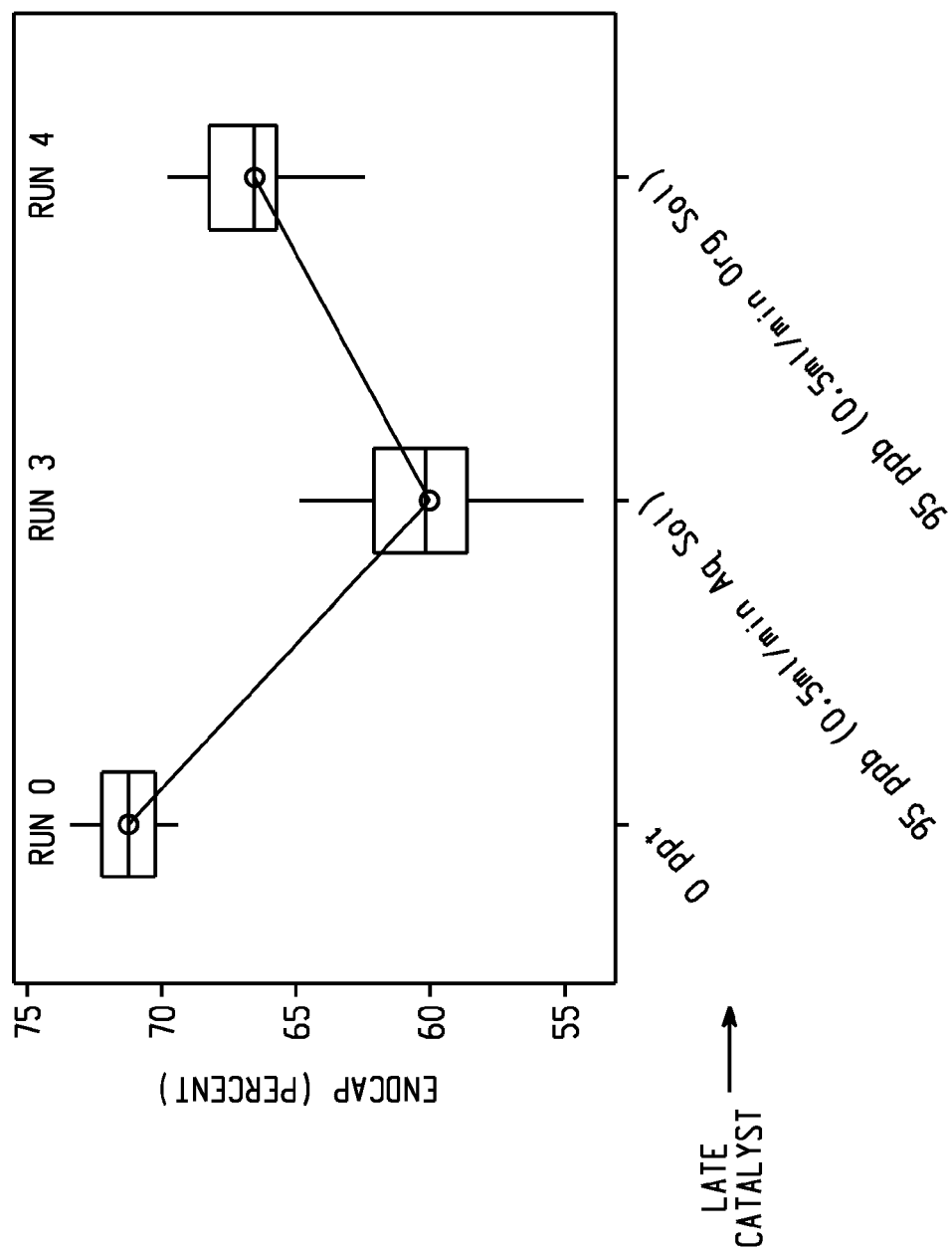
FIG. 7 shows a study of the effect of different late-addition catalyst matrix formulations and flow rate of Illustration C in the example section.

Illustration C:

The effect of the catalyst matrix over the polymer end groups was studied. As shown in FIG. 7, a drop in product endcap (as shown as a ratio of phenoxide end groups to total endgroups) is larger when using the aqueous solution. It is has been found that water hydrolyzes polycarbonate phenoxide endgroups so it is believed that the water in the aqueous matrix hydrolyzes the terminal phenoxide endgroups to a larger extent than the organic matrix. Higher endcap level is often desirable in polycarbonate for stability purposes, thus organic liquid carrier matrix or a liquid carrier with minimal water (e.g. less than 10 wt % water) helps to preserve stability.

Figure 8:
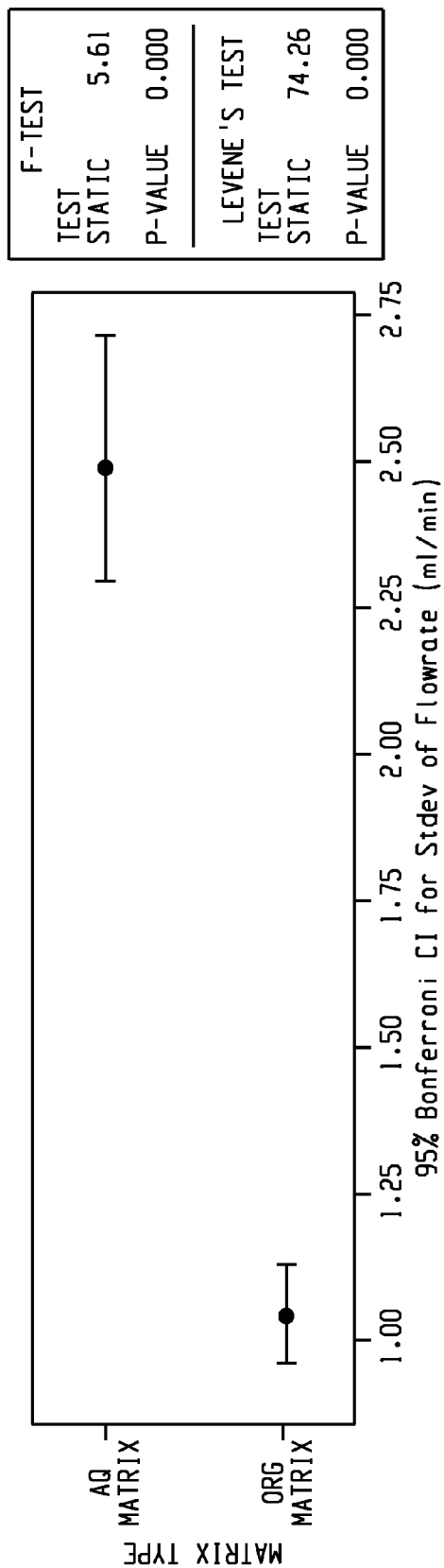
FIG. 8 shows the graphical results of Illustration D.
Figure 8:
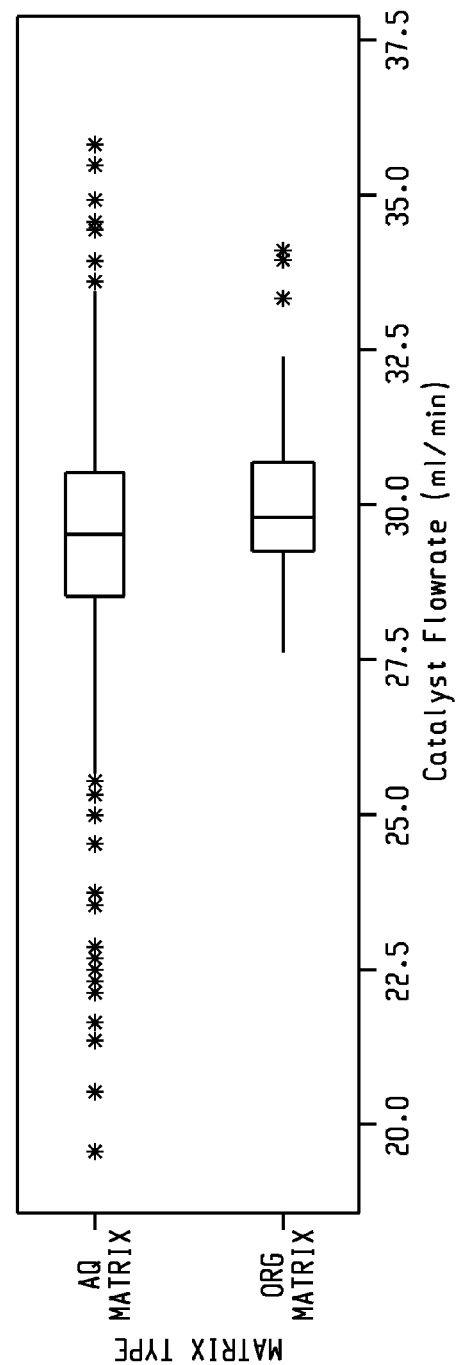

Illustration D:

This experiment demonstrates that the late addition of an aqueous matrix into a molten polymer intermediate stream in a melt polycarbonate production process produces a higher instability in the flow vs. the present organic liquid carrier. It is believed that this is the result of the lack of miscibility of water with the polymer which creates flow issues at the injection point. FIG. 8 shows that a late-addition catalyst formulation is more stable using the organic matrix of the present invention rather than a high water content matrix (e.g. an aqueous matrix), as the standard deviation of the aqueous liquid carrier matrix is higher.

Figure 9:
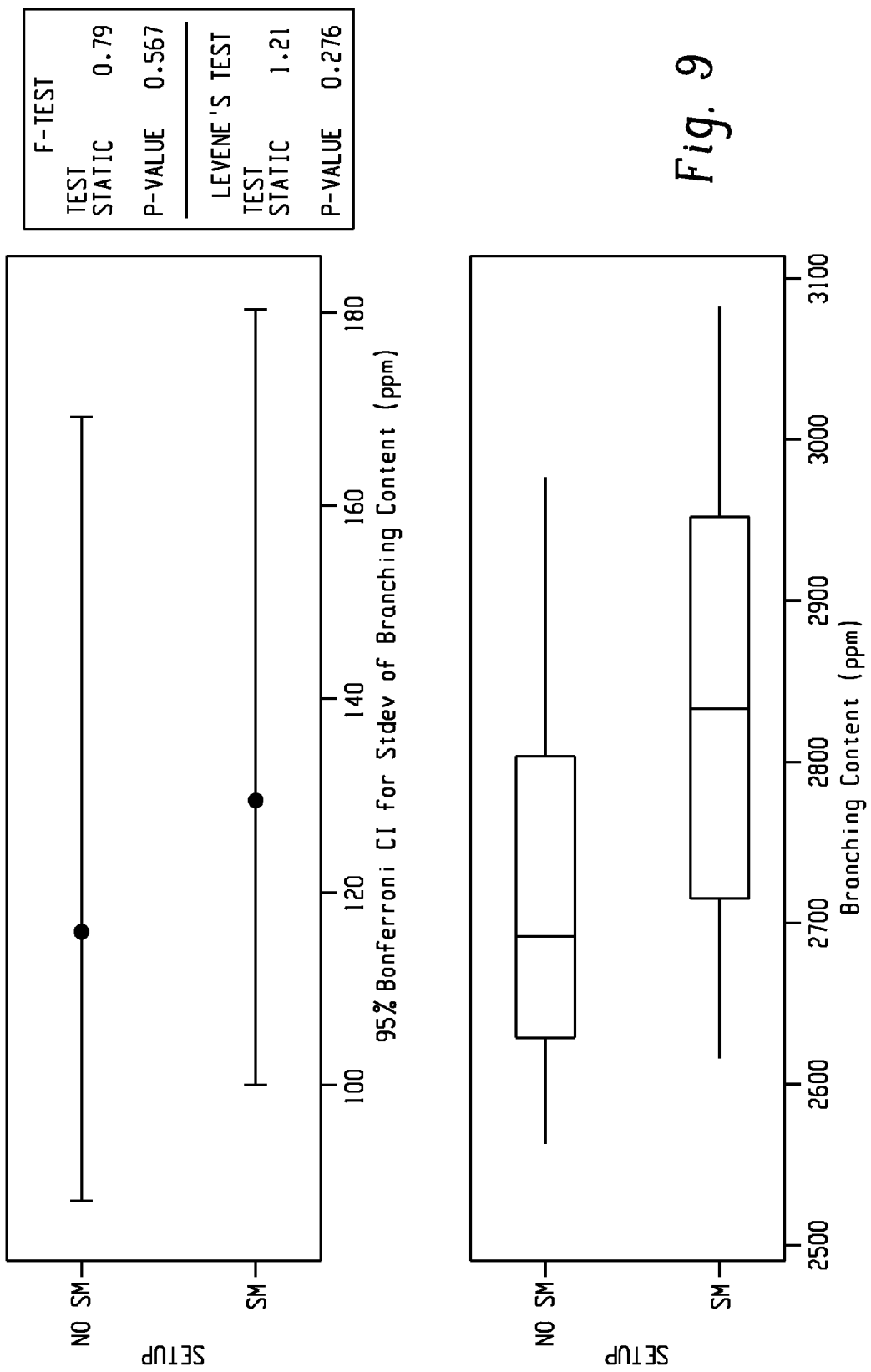
FIG. 9 shows the graphical results of Illustration E.

Illustration E:

The benefits of the organic liquid carrier matrix in obtaining beneficial dispersion properties and effectiveness of the catalyst in the intermediate polymer stream were further studied by removing the static mixer 419 installed downstream the injection point. Again branching build up was used as a measurement of the catalytic efficiency of the late catalyst addition. FIG. 9 shows the comparison of the variability in branching content obtained in two different runs: one using a static mixer and a second one without the mixing device. As the statistical analysis indicates little to no difference in variability is seen between the runs and thus there is no specific requirement for a mixing device downstream the injection point when the late catalyst addition comprises the present organic late-addition catalyst formulation.

Figure 10:
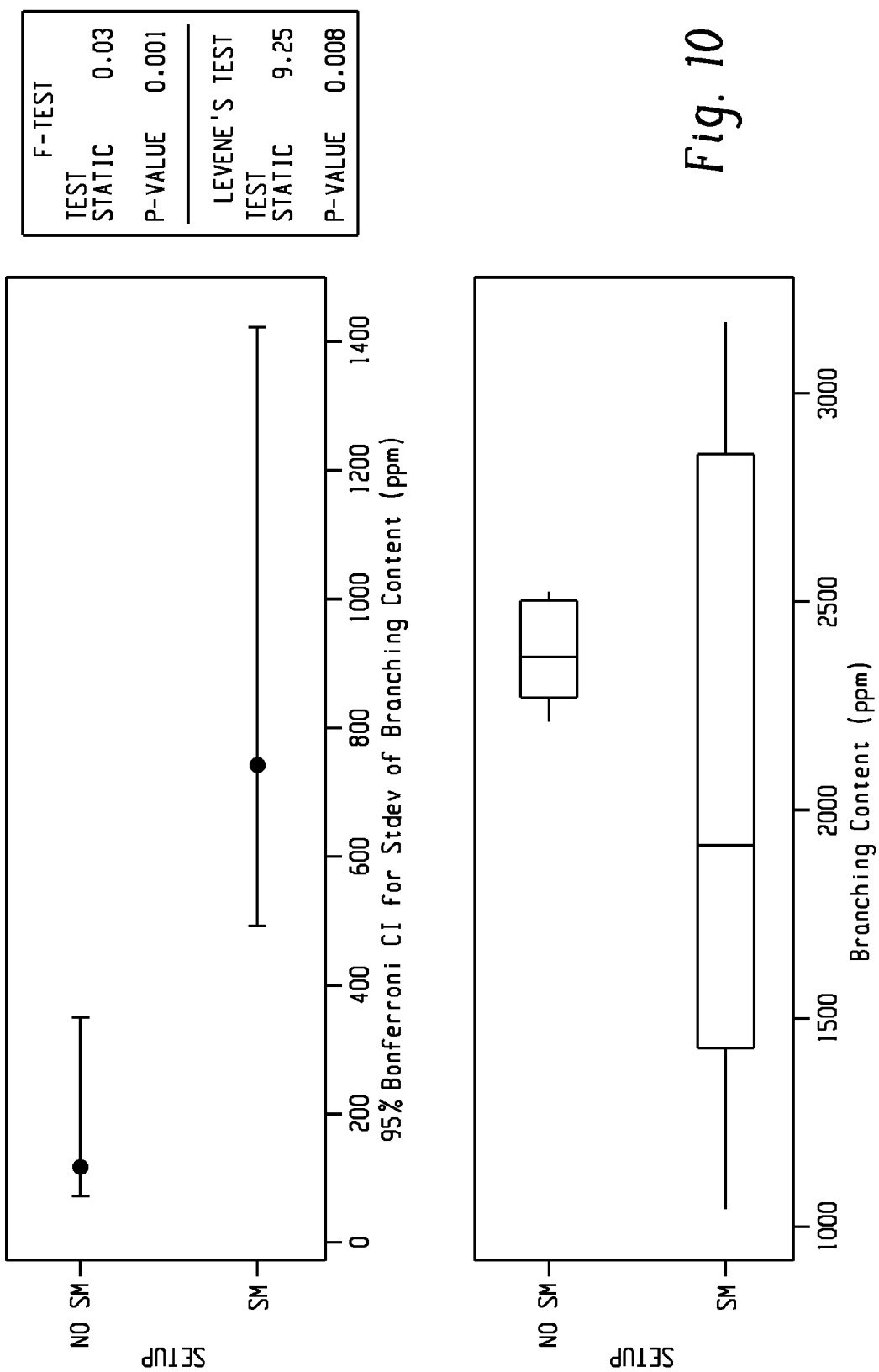
FIG. 10 shows the graphical results of Illustration F.

Illustration F:

Similar runs as demonstrated in Illustration E were performed using water as catalyst carrier. As it can be seen in FIG. 10 much higher variability in branching content is observed without the static mixer. This result demonstrates the superior and unexpected benefits of using the organic liquid carrier (phenol/cosolvent) of the late-addition catalyst formulation.

Figure 11:
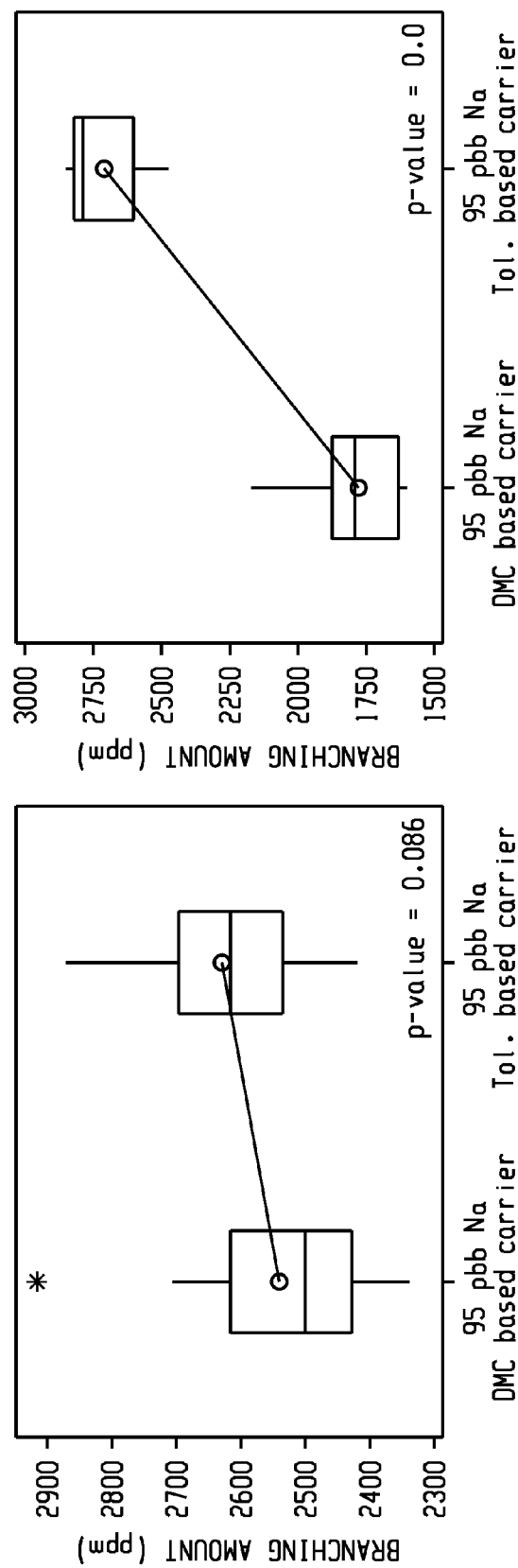
FIG. 11 shows the graphical results of Illustration G.

Illustration G:

Different cosolvents in the liquid carrier (e.g. other than toluene) can be used, however as shown herein toluene is desirable. In the following illustration dimethyl carbonate (DMC) was used as the cosolvent in the liquid carrier. As demonstrated in FIG. 11, catalyst effectiveness again measured by the buildup of branching, branching promotion of a phenol/DMC liquid carrier matrix is not as beneficial at low relative flow rates compared with the toluene based one. However when late catalyst addition flow rate is increased, the effectiveness is similar between both cosolvents. It is believed that this variation is due to the formation of gases in the injection point and caused by the hydrolysis of DMC at the injection temperatures (close to the temperature of the molten polymer stream) in the presence of small amounts of water and caustic. This may lead to intensive flashing and losses of catalyst to the overhead vacuum and/or degradation. The data reveals however that a phenol/toluene based carrier is more stable under the operating conditions and thus a desirable choice for adding the late-addition catalyst formulation at low flow rates.

Illustration H:

The effect on the feed rate and melt catalyst concentration of late-addition catalyst formulation was also studied. Two different late-addition formulations were used at different flow rates to introduce 95 ppb to the system:

(A) Catalyst solution consisting of a 3.4% wt of a 0.6% aqueous solution of NaOH, and the balance formed by a PhOH-Toluene mixture in a weight ratio 2:1. Flow rate of catalyst solution added was 0.5 ml/min.

(B) Catalyst solution consisting of a 3.4% wt of a 1.51% aqueous solution of NaOH, and the balance formed by a PhOH-Toluene mixture in a weight ratio 2:1. Flow rate of catalyst solution added was 0.2 ml/min.

Figure 12A:
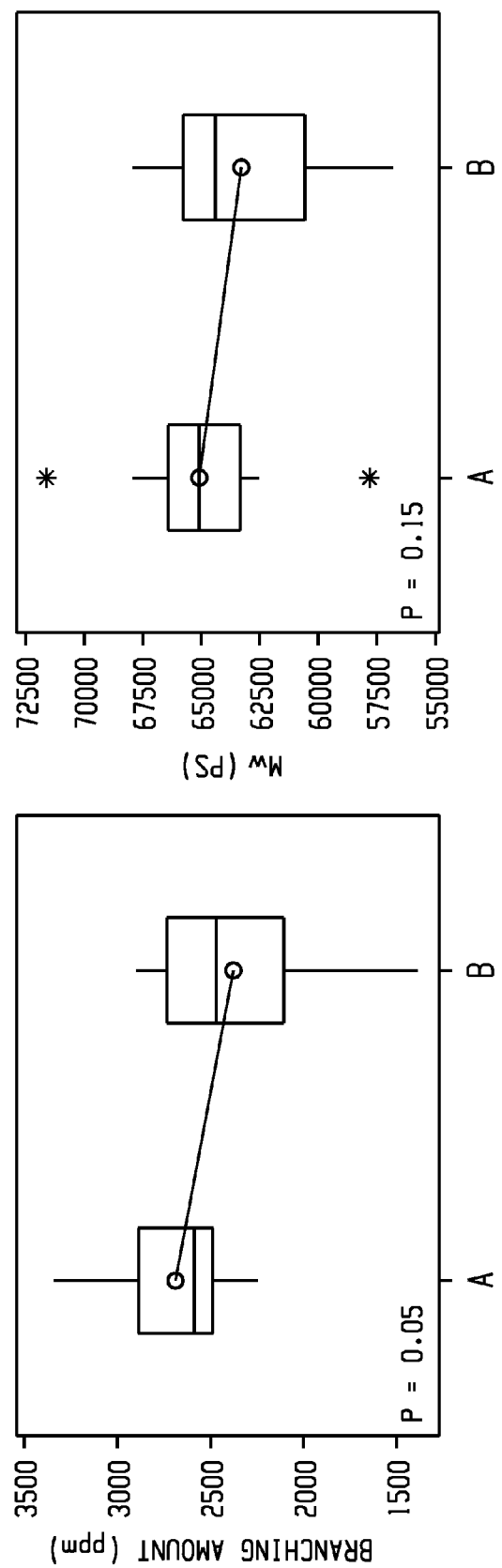
FIGS. 12A and 12B show the graphical results of Illustration H.
Figure 12B:
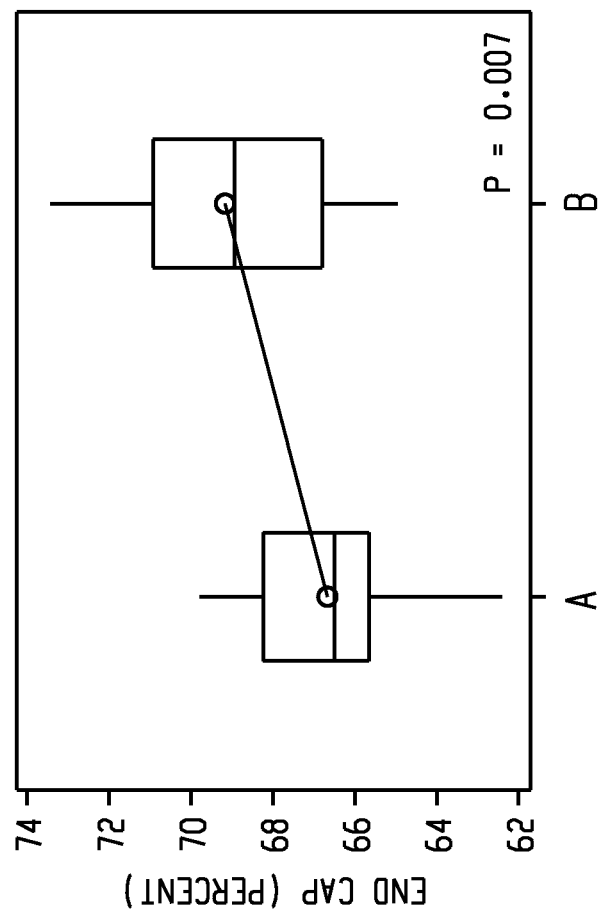

As depicted in FIGS. 12A and 12B both solutions are equally efficient as indicated by the ability to increase the amount of branching content in the product polycarbonate exiting the last reactor. There are no significant differences between the solutions on product polycarbonate. It is believed however that higher catalyst concentrations only slightly favors larger Endcap due to lower phenol concentration.

Illustration I:

Studies were conducted to find the optimum phenol:cosolvent ratio. As seen in illustration H, decreasing the amount of phenol in the organic matrix has a slight positive effect on maintaining a higher Endcap level in the polycarbonate produced with the late catalyst addition. Also, it is important to know what is the minimum phenol:cosolvent ratio that still allows for catalyst to be soluble in the carrier matrix. In one embodiment the amount of phenol in the liquid carrier is minimized as compared to the cosolvent since phenol can react with the polymer chain to decrease molecular weight. Table 3 shows the effect of phenol:cosolvent weight ratio when toluene is used as solvent. Suitable ratios are 1:1 to 2:1 as seen by the ability to dissolve and maintain catalyst in solution.

Also in Table 4, Anisole was studied as the cosolvent with similar weight ratios found. Anisole might be more preferable than toluene when diphenyl carbonate is the carbonate source and it is created by transesterification of dimethyl carbonate with phenol. Anisole is an existing byproduct of that process. As can be seen a ratio of phenol:anisole 1:1 to 2:1 is suitable from a catalyst solubility viewpoint.

TABLE 3

| Component ratios (wt) | | | |
|---|---|---|---|
| NaOH (aq. 2000 ppm) | Toluene | Phenol | Appearance |
| 1 | 9 | 4.5 | Turbid (2 phases) |
| 1 | 9 | 9 | Almost clear |
| 1 | 9 | 18 | Clear (1 phase) |
| 1 | 9 | 36 | Clear (1 phase) |

TABLE 4

| Component ratios (wt) | | | |
|---|---|---|---|
| NaOH (aq. 2000 ppm) | Anisol | Phenol | Appearance |
| 1 | 9 | 4.5 | Turbid (2 phases) |
| 1 | 9 | 9 | Almost clear |
| 1 | 9 | 18 | Clear (1 phase) |
| 1 | 9 | 36 | Clear (1 phase) |

It is also possible to completely remove water from the late-addition catalyst formulation. As shown in Table 5, this can be accomplished for example by dissolving solid NaOH in the liquid carrier. Again suitable ratios are 1:1 to 2:1 phenol:cosolvent.

TABLE 5

| Component rations (wt) | | | |
|---|---|---|---|
| NaOH (solid) | Toluene | Phenol | Solubility |
| 16 ppm | 33.3 | 66.6 | Yes - slow dissolving rate |
| 208 ppm | 33.3 | 66.6 | Yes - slow dissolving rate |
| 58 ppm | 50 | 50 | Yes - very slow dissolving rate |

In one embodiment, a melt polymerization reactor system for producing a product polycarbonate can comprise: a first polymerization reactor, a first finishing line having a second polymerization reactor, and a late-addition catalyst vessel. The reactor system can be connected in the following configuration: (i) the first finishing line connected to the first polymerization reactor, and (ii) the late-addition catalyst vessel connected to the first finishing line at the second polymerization reactor, between the first and second polymerization reactor, or a combination thereof. The first polymerization reactor can contain an intermediate polycarbonate having a number average molecular weight (Mn) based upon polycarbonate standards (GPC) of 2,500 to 25,000 g/mol and unreacted reaction components including a dihydroxy compound, a diaryl carbonate, and a melt transesterification catalyst. The second polymerization reactor can contain the product polycarbonate having a higher molecular weight than the intermediate polycarbonate, a higher content of branching structures than the intermediate polycarbonate, or both. The late-addition catalyst vessel contains a late-addition catalyst formulation comprising a melt transesterification catalyst dispersed in a liquid carrier system.

In an embodiment, a method for producing a product polycarbonate can comprise: (i) treating a plurality of reaction components under melt polymerization conditions sufficient to produce an intermediate polycarbonate having a number average molecular weight (Mn) based upon polycarbonate standards (GPC) of 2,500 to 25,000 g/mol; (ii) introducing a late-addition catalyst formulation to the intermediate polycarbonate produced in step (i) in an amount effective to catalyze molecular weight build, catalyze a branching reaction, or catalyze both molecular weight build and a branching reaction, and (iii) treating the intermediate polycarbonate and late-addition catalyst formulation from step (ii) under melt polymerization conditions sufficient to produce a product polycarbonate; thereby producing a product polycarbonate. The plurality of reaction components can comprise a dihydroxy compound, a diaryl carbonate, and a melt transesterification catalyst. The late-addition catalyst formulation can comprise a melt transesterification catalyst dispersed in a liquid carrier system. The product polycarbonate can have a higher molecular weight than the intermediate polycarbonate formed in step (i), a higher content of branching structures than the intermediate polycarbonate formed in step (i), or both.

A late-addition catalyst formulation comprising a melt transesterification catalyst dispersed in an organic liquid carrier system comprising phenol and a cosolvent, wherein the formulation contains less than 10 wt % water and the melt transesterification catalyst is present in the formulation in a range of 50 ppm to 60,000 ppm.

In the various embodiments of the reactor system, (i) the late-addition catalyst formulation contains less than 10 wt % water based upon a total weight of the late-addition catalyst formulation; and/or (ii) the liquid carrier system of the late-addition catalyst formulation comprises phenol and a cosolvent, and wherein the melt transesterification catalyst is present in the formulation in a range of 50 ppm to 60,000 ppm; and/or (iii) the cosolvent comprises toluene, anisole, or both toluene and anisole; and/or (iv) the cosolvent comprises toluene and the weight ratio of phenol to toluene in the liquid carrier system is in a range of 1:2 to 2:1; and/or (v) the weight ratio of phenol to toluene in the liquid carrier system is in a range of 1:2 to 1:1; and/or (vi) the formulation contains less than 5 wt % water; and/or (vii) the formulation contains no water; and/or (viii) there is no mixing device between the late-addition catalyst tank and the second polymerization reactor; and/or (ix) the melt transesterification catalyst of the late-addition catalyst formulation is different from the melt transesterification catalyst in the first polymerization reactor; and/or (x) the melt transesterification catalyst in the late-addition catalyst formulation comprises a beta catalyst and the melt transesterification catalyst in the first polymerization reactor comprises an alpha catalyst; and/or (xi) the melt transesterification catalyst in the first polymerization reactor comprises an alkali metal salt of a phosphoric acid, an alkaline earth metal salt of a phosphoric acid, or combinations thereof, and the melt transesterification catalyst in the late-addition catalyst formulation is selected from the group consisting of: an alkali metal hydroxide, an alkali earth metal hydroxide, an alkali metal carbonate, an alkali earth metal carbonate, an alkali metal salt of a carboxylic acid, and an alkaline earth metal salt of a carboxylic acid; and/or (xii) the melt transesterification catalyst in the first polymerization reactor comprises $NaKHPO_4$ and the melt transesterification catalyst in the late-addition catalyst formulation comprises NaOH; and/or (xiii) the system further comprises a control system configured to: (a) determine a characteristic of the polycarbonate exiting the second polymerization reactor, (b) compare the determined characteristic of the polycarbonate exiting the second polymerization reactor with a desired characteristic of the polycarbonate exiting the second polymerization reactor, and (c) determine and meter a flow rate of the late-addition catalyst formulation from the late-addition catalyst vessel to the first finishing line based upon the comparison made in step (b); and/or (xiv) the control system in operation determines a characteristic of the polycarbonate exiting the second polymerization reactor by receiving a signal from the second polymerization reactor that is representative of its operating temperature, pressure, electrical consumption, torque, or any combination thereof; and/or (xv) the determined characteristic of the polycarbonate relates to the polycarbonate's molecular weight, level of the polycarbonate's terminal end-capping, level of the polycarbonate's branching, or any combination thereof; and/or (xvi) the system further comprises a second finishing line having a third polymerization reactor, wherein the reactor system is connected in the following configuration: the first finishing line and second finishing line are connected in parallel to the first polymerization reactor, and the late-addition catalyst vessel is connected to second finishing line at the third polymerization reactor, between the first and third polymerization reactors, or a combination thereof, wherein, the control system is configured to: (a) determine a characteristic of the polycarbonate exiting the third polymerization reactor, (b) compare the determined characteristic of the polycarbonate exiting the third polymerization reactor with a desired characteristic of the polycarbonate exiting the third polymerization reactor, and (c) determine and meter a flow rate of the late-addition catalyst formulation from the late-addition catalyst vessel to the second finishing line based upon the comparison made in step (b); and/or (xvii) the determined and metered flow rate of the late-addition catalyst formulation to the first and second finishing lines from the late-addition catalyst vessel are different from one another; and/or (xviii) further comprises a second finishing line having a third polymerization reactor, wherein the reactor system is connected in the following configuration: (a) the first finishing line and second finishing line are connected in parallel to the first polymerization reactor, and (b) the late-addition catalyst vessel is connected to second finishing line at the third polymerization reactor, between the first and third polymerization reactor, or a combination thereof; and/or (xix) the concentration of melt transesterification catalyst in the late-addition catalyst formulation is greater than the residual concentration of melt transesterification catalyst in the intermediate polycarbonate exiting the first polymerizer.

In the various embodiments of the method, (i) the late-addition catalyst formulation contains less than 10 wt % water; and/or (ii) the liquid carrier system of the late-addition catalyst formulation comprises phenol and a cosolvent, and wherein the melt transesterification catalyst is present in the formulation in a range of 50 ppm to 60,000 ppm; and/or (iii) the cosolvent comprises toluene, anisole, or both toluene and anisole; and/or (iv) the cosolvent comprises toluene and the weight ratio of phenol to toluene in the liquid carrier system is in a range of 1:2 to 2:1; and/or (v) the weight ratio of phenol to toluene in the liquid carrier system is in a range of 1:1 to 2:1; and/or (vi) the formulation contains less than 5 wt % water; and/or (vii) the formulation contains no water; and/or (viii) there is no separate mixing device or mixing step between steps (ii) and (iii); and/or (ix) the method further comprises the step of, before step (ii), forming and maintaining the late-addition catalyst formulation at room temperature; and/or (x) the late-addition catalyst formulation is at room temperature when it is introduced to the intermediate polycarbonate in step (ii); and/or (xi) the melt transesterification catalyst of the late-addition catalyst formulation introduced in step (ii) is different from the melt transesterification catalyst used in step (i); and/or (xii) the melt transesterification catalyst in the late-addition catalyst formulation introduced in step (ii) comprises a beta catalyst and the melt transesterification catalyst used in step (i) comprises an alpha catalyst; and/or (xiii) wherein: the melt transesterification catalyst used in step (i) comprises an alkali metal salt of a phosphoric acid, an alkaline earth metal salt of a phosphoric acid, or combinations thereof, and the melt transesterification catalyst introduced in step (ii) is selected from the group consisting of: an alkali metal hydroxide, an alkali earth metal hydroxide, an alkali metal carbonate, an alkali earth metal carbonate, an alkali metal salt of a carboxylic acid, and an alkaline earth metal salt of a carboxylic acid; and/or (xiv) the melt transesterification catalyst used in step (i) comprises $NaKHPO_4$ and the melt transesterification catalyst in the late-addition catalyst formulation introduced in step (ii) comprises NaOH; and/or (xv) further comprises the step of: between steps (i) and (ii), splitting the intermediate polycarbonate produced in step (i) into a first and a second finishing line, wherein: step (ii) is performed by introducing the late-addition catalyst formulation to the intermediate polycarbonate in either or both the first and/or second finishing lines, and step (iii) is performed by treating the intermediate polycarbonate and late-addition catalyst formulation where present in the first and/or second finishing lines from step (ii) under melt polymerization conditions; and/or (xvi) the late-addition catalyst formulation is introduced in different amounts to the intermediate polycarbonate to both the first and the second finishing lines; and/or (xvii) the intermediate polycarbonate has a weight average molecular weight (Mn) based upon polycarbonate standards (GPC) of 7,000 to 14,000 g/mol and wherein the product polycarbonate has a Mn based upon polycarbonate standards greater than that of the intermediate polycarbonate; and/or (xviii) the intermediate polycarbonate has a branching content of at least 200 ppm and the product polycarbonate has a higher branching content than that of the intermediate polycarbonate; and/or (xix) the concentration of melt transesterification catalyst in the late-addition catalyst formulation is greater than the residual concentration of melt transesterification catalyst in the intermediate polycarbonate exiting the first polymerizer.

In the various embodiments, (i) the cosolvent comprises toluene, anisole, or both toluene and anisole; and/or (ii) the cosolvent comprises toluene and the weight ratio of phenol to toluene in the liquid carrier system is in a range of 1:2 to 2:1; and/or (iii) the weight ratio of phenol to toluene in the liquid carrier system is in a range of 1:2 to 1:1 and/or (iv) the formulation contains less than 5 wt % water; and/or (v) the formulation contains no water; and/or (vi) the melt transesterification catalyst comprises an alpha catalyst, a beta catalyst, or both an alpha or beta catalyst.

The invention claimed is:

1. A melt polymerization reactor system for producing a product polycarbonate, the reactor system comprising:
    a first polymerization reactor, a first finishing line having a second polymerization reactor, and a late-addition catalyst vessel, wherein:
    the reactor system is connected in the following configuration:
        (i) the first finishing line connected to the first polymerization reactor, and
        (ii) the late-addition catalyst vessel connected to the first finishing line at the second polymerization reactor, between the first and second polymerization reactor, or a combination thereof, and
    the first polymerization reactor contains an intermediate polycarbonate having a number average molecular weight (Mn) based upon polycarbonate standards (GPC) of 2,500 to 25,000 g/mol and unreacted reaction components including a dihydroxy compound, a diaryl carbonate, and a melt transesterification catalyst,
    the second polymerization reactor contains the product polycarbonate having a higher molecular weight than the intermediate polycarbonate, a higher content of branching structures than the intermediate polycarbonate, or both,
    the late-addition catalyst vessel contains a late-addition catalyst formulation comprising a melt transesterification catalyst dispersed in a liquid carrier system, wherein the liquid carrier system comprises phenol.

2. The reactor system of claim 1, wherein the late-addition catalyst formulation contains less than 10 wt % water based upon a total weight of the late-addition catalyst formulation.

3. The reactor system of claim 1, wherein the liquid carrier system of the late-addition catalyst formulation comprises a cosolvent and wherein the weight ratio of phenol to cosolvent is in the range of 1:3 to 3:1.

4. The reactor system of claim 3, wherein the cosolvent comprises toluene, anisole, or both toluene and anisole.

5. The reactor system of claim 4, wherein the cosolvent comprises toluene and the weight ratio of phenol to toluene in the liquid carrier system is in a range of 1:2 to 2:1.

6. The reactor system of claim 5, wherein the weight ratio of phenol to toluene in the liquid carrier system is in a range of 1:2 to 1:1.

7. The reactor system of claim 1, wherein the formulation contains less than 5 wt % water.

8. The reactor system of claim 1, wherein the formulation contains no water.

9. The reactor system of claim 1, wherein there is no mixing device between the late-addition catalyst tank and the second polymerization reactor.

10. The reactor system of claim 1, wherein the melt transesterification catalyst of the late-addition catalyst formulation is different from the melt transesterification catalyst in the first polymerization reactor.

11. The reactor system of claim 1, wherein the melt transesterification catalyst in the late-addition catalyst formulation comprises a beta catalyst and the melt transesterification catalyst in the first polymerization reactor comprises an alpha catalyst.

12. The reactor system of claim 1, wherein:
   the melt transesterification catalyst in the first polymerization reactor comprises an alkali metal salt of a phosphoric acid, an alkaline earth metal salt of a phosphoric acid, or combinations thereof, and
   the melt transesterification catalyst in the late-addition catalyst formulation is selected from the group consisting of: an alkali metal hydroxide, an alkali earth metal hydroxide, an alkali metal carbonate, an alkali earth metal carbonate, an alkali metal salt of a carboxylic acid, and an alkaline earth metal salt of a carboxylic acid.

13. The reactor system of claim 12, wherein the melt transesterification catalyst in the first polymerization reactor comprises $NaKHPO_4$ and the melt transesterification catalyst in the late-addition catalyst formulation comprises NaOH.

14. The reactor system of claim 1, further comprising a control system configured to:
   (i) determine a characteristic of the polycarbonate exiting the second polymerization reactor,
   (ii) compare the determined characteristic of the polycarbonate exiting the second polymerization reactor with a desired characteristic of the polycarbonate exiting the second polymerization reactor, and
   (iii) determine and meter a flow rate of the late-addition catalyst formulation from the late-addition catalyst vessel to the first finishing line based upon the comparison made in step (ii).

15. The reactor system of claim 14, wherein the control system in operation determines a characteristic of the polycarbonate exiting the second polymerization reactor by receiving a signal from the second polymerization reactor that is representative of its operating temperature, pressure, electrical consumption, torque, or any combination thereof.

16. The reactor system of claim 15, wherein the determined characteristic of the polycarbonate relates to the polycarbonate's molecular weight, level of the polycarbonate's terminal endcapping, level of the polycarbonate's branching, or any combination thereof.

17. The reactor system of claim 14, further comprising a second finishing line having a third polymerization reactor, wherein the reactor system is connected in the following configuration:
   (i) the first finishing line and second finishing line are connected in parallel to the first polymerization reactor, and
   (ii) the late-addition catalyst vessel is connected to second finishing line at the third polymerization reactor, between the first and third polymerization reactors, or a combination thereof,
   wherein, the control system is configured to:
   (a) determine a characteristic of the polycarbonate exiting the third polymerization reactor,
   (b) compare the determined characteristic of the polycarbonate exiting the third polymerization reactor with a desired characteristic of the polycarbonate exiting the third polymerization reactor, and
   (c) determine and meter a flow rate of the late-addition catalyst formulation from the late-addition catalyst vessel to the second finishing line based upon the comparison made in step (b).

18. The reactor system of claim 17, wherein the determined and metered flow rate of the late-addition catalyst formulation to the first and second finishing lines from the late-addition catalyst vessel are different from one another.

19. The reactor system of claim 1, further comprising a second finishing line having a third polymerization reactor, wherein the reactor system is connected in the following configuration:
   (i) the first finishing line and second finishing line are connected in parallel to the first polymerization reactor, and
   (ii) the late-addition catalyst vessel is connected to second finishing line at the third polymerization reactor, between the first and third polymerization reactor, or a combination thereof.

20. The reactor system of claim 1, wherein the concentration of melt transesterification catalyst in the late-addition catalyst formulation is greater than the residual concentration of melt transesterification catalyst in the intermediate polycarbonate exiting the first polymerizer.

21. A method for producing a product polycarbonate comprising the steps of:
   (i) treating a plurality of reaction components under melt polymerization conditions sufficient to produce an intermediate polycarbonate having a number average molecular weight (Mn) based upon polycarbonate standards (GPC) of 2,500 to 25,000 g/mol, wherein the plurality of reaction components comprise a dihydroxy compound, a diaryl carbonate, and a melt transesterification catalyst,
   (ii) introducing a late-addition catalyst formulation to the intermediate polycarbonate produced in step (i) in an amount effective to catalyze molecular weight build, catalyze a branching reaction, or catalyze both molecular weight build and a branching reaction, the late-addition catalyst formulation comprising a melt transesterification catalyst dispersed in a liquid carrier system, wherein the liquid carrier system comprises phenol, and
   (iii) treating the intermediate polycarbonate and late-addition catalyst formulation from step (ii) under melt polymerization conditions sufficient to produce a product polycarbonate,
   wherein the product polycarbonate has a higher molecular weight than the intermediate polycarbonate formed in step (i), a higher content of branching structures than the intermediate polycarbonate formed in step (i), or both, thereby producing a product polycarbonate.

22. The method of claim 21, wherein the late-addition catalyst formulation contains less than 10 wt % water.

23. The method of claim 21, wherein the liquid carrier system of the late-addition catalyst formulation comprises a cosolvent, and wherein the weight ratio of phenol to cosolvent is in the range of 1:3 to 3:1.

24. The method of claim 23, wherein the cosolvent comprises toluene, anisole, or both toluene and anisole.

25. The method of claim 24, wherein the cosolvent comprises toluene and the weight ratio of phenol to toluene in the liquid carrier system is in a range of 1:2 to 2:1.

26. The method of claim 25, wherein the weight ratio of phenol to toluene in the liquid carrier system is in a range of 1:1 to 2:1.

27. The method of claim 21, wherein the formulation contains less than 5 wt % water.

28. The method of claim 21, wherein the formulation contains no water.

29. The method of claim 21, wherein there is no separate mixing device or mixing step between steps (ii) and (iii).

30. The method of claim 21, wherein the method further comprises the step of, before step (ii), forming and maintaining the late-addition catalyst formulation at room temperature.

31. The method of claim 30, wherein the late-addition catalyst formulation is at room temperature when it is introduced to the intermediate polycarbonate in step (ii).

32. The method of claim 21, wherein the melt transesterification catalyst of the late-addition catalyst formulation introduced in step (ii) is different from the melt transesterification catalyst used in step (i).

33. The method of claim 21, wherein the melt transesterification catalyst in the late-addition catalyst formulation introduced in step (ii) comprises a beta catalyst and the melt transesterification catalyst used in step (i) comprises an alpha catalyst.

34. The method of claim 21, wherein:
the melt transesterification catalyst used in step (i) comprises an alkali metal salt of a phosphoric acid, an alkaline earth metal salt of a phosphoric acid, or combinations thereof, and
the melt transesterification catalyst introduced in step (ii) is selected from the group consisting of an alkali metal hydroxide, an alkali earth metal hydroxide, an alkali metal carbonate, an alkali earth metal carbonate, an alkali metal salt of a carboxylic acid, and an alkaline earth metal salt of a carboxylic acid.

35. The method of claim 34, wherein the melt transesterification catalyst used in step (i) comprises $NaKHPO_4$ and the melt transesterification catalyst in the late-addition catalyst formulation introduced in step (ii) comprises NaOH.

36. The method of claim 21, further comprising the step of:
between steps (i) and (ii), splitting the intermediate polycarbonate produced in step (i) into a first and a second finishing line, wherein:
step (ii) is performed by introducing the late-addition catalyst formulation to the intermediate polycarbonate in either or both the first and/or second finishing lines, and
step (iii) is performed by treating the intermediate polycarbonate and late-addition catalyst formulation where present in the first and/or second finishing lines from step (ii) under melt polymerization conditions.

37. The method of claim 36, wherein the late-addition catalyst formulation is introduced in different amounts to the intermediate polycarbonate to both the first and the second finishing lines.

38. The method of claim 21, wherein the intermediate polycarbonate has a weight average molecular weight (Mn) based upon polycarbonate standards (GPC) of 7,000 to 14,000 g/mol and wherein the product polycarbonate has a Mn based upon polycarbonate standards greater than that of the intermediate polycarbonate.

39. The method of claim 21, wherein the intermediate polycarbonate has a branching content of at least 200 ppm and the product polycarbonate has a higher branching content than that of the intermediate polycarbonate.

40. The method of claim 21, wherein the concentration of melt transesterification catalyst in the late-addition catalyst formulation is greater than the residual concentration of melt transesterification catalyst in the intermediate polycarbonate exiting the first polymerizer.

41. A late-addition catalyst formulation comprising a melt transesterification catalyst dispersed in an organic liquid carrier system comprising phenol and a cosolvent, wherein the formulation contains less than 10 wt % water and the melt transesterification catalyst is present in the formulation in a range of 50 ppm to 60,000 ppm.

42. The formulation of claim 41, wherein the cosolvent comprises toluene, anisole, or both toluene and anisole.

43. The formulation of claim 41, wherein the cosolvent comprises toluene and the weight ratio of phenol to toluene in the liquid carrier system is in a range of 1:2 to 2:1.

44. The formulation of claim 41, wherein the formulation contains less than 5 wt % water.

45. The formulation of claim 41, wherein the formulation contains no water.

* * * * *